(12) United States Patent
Colley

(10) Patent No.: US 10,788,301 B2
(45) Date of Patent: Sep. 29, 2020

(54) GEOMETRIC TOOL

(71) Applicant: John Christian Colley, Harrison City, PA (US)

(72) Inventor: John Christian Colley, Harrison City, PA (US)

(*) Notice: Subject to any disclaimer, the term of this patent is extended or adjusted under 35 U.S.C. 154(b) by 90 days.

(21) Appl. No.: 16/198,481

(22) Filed: Nov. 21, 2018

(65) Prior Publication Data

US 2020/0158484 A1 May 21, 2020

(51) Int. Cl.
*G01B 3/14* (2006.01)

(52) U.S. Cl.
CPC ........................ *G01B 3/14* (2013.01)

(58) Field of Classification Search
CPC .......... B43L 7/10; B43L 9/007; G01B 3/566; G01B 3/14
USPC .......................................... 33/613, 452, 456
See application file for complete search history.

(56) References Cited

U.S. PATENT DOCUMENTS

| 144,003 | A | * | 10/1873 | Waterbury | G01B 3/56 33/465 |
|---|---|---|---|---|---|
| 278,405 | A | * | 5/1883 | Cumming et al. | G01B 3/56 33/456 |
| 357,487 | A | * | 2/1887 | Kline et al. | G01B 3/56 33/465 |
| 376,301 | A | * | 1/1888 | Gould | G01B 3/56 33/473 |
| 707,461 | A | * | 8/1902 | Stedman | G01B 3/56 33/455 |
| 1,313,432 | A | * | 8/1919 | Walker | G01B 3/56 33/341 |
| 1,461,392 | A | * | 7/1923 | Ingstead | G01B 3/56 33/473 |
| 1,524,392 | A | * | 1/1925 | East | G01B 3/56 33/460 |
| 1,581,225 | A | * | 4/1926 | Parkhill | B27G 17/00 33/465 |
| 1,611,718 | A | * | 12/1926 | Child | G01B 3/04 33/456 |
| 2,353,989 | A | * | 7/1944 | Beaucage | G01B 3/56 33/425 |
| 2,419,597 | A | * | 4/1947 | Rushmore | G01C 1/00 33/279 |
| 2,846,769 | A | | 8/1958 | Colont | |
| 3,693,261 | A | * | 9/1972 | Moore | B43L 7/12 33/1 AP |

(Continued)

*Primary Examiner* — Yaritza Guadalupe-McCall

(57) ABSTRACT

A geometric tool for capturing the relative positions of points on a geometric profile, thus creating a template for use in geometric representation and replication. The geometric tool comprises three or more pointers, and a means for constraining motion of the pointers. The pointers each comprise a rigid longitudinal member with a definitive a tip. The means for constraining motion of the pointers is such that the pointers can only pivot and radially translate with respect to a shared axis of rotation. In addition, the means for constraining motion of the pointers also contains a mechanism for the user to fully constrain the pointers with respect to the shared axis of rotation. This construction provides a simple and convenient geometric tool which offers an errorless method for capturing the relative positions of points on a geometric profile for use in further representation and replication.

19 Claims, 24 Drawing Sheets

(56) References Cited

U.S. PATENT DOCUMENTS

| | | | | |
|---|---|---|---|---|
| 3,740,779 | A | * | 6/1973 | Rubricuis .......... A61B 17/3213 |
| | | | | 7/163 |
| 4,715,124 | A | | 12/1987 | Harrington |
| 5,359,782 | A | * | 11/1994 | Langmaid ................ B25H 7/00 |
| | | | | 33/415 |
| 5,669,149 | A | | 9/1997 | Meitzler |
| 6,101,730 | A | * | 8/2000 | Marino .................. B28D 1/225 |
| | | | | 33/456 |
| 6,829,837 | B2 | * | 12/2004 | Williams .................. B43L 7/10 |
| | | | | 33/1 AP |
| 6,978,550 | B2 | | 12/2005 | Xieh |
| 7,269,910 | B2 | | 9/2007 | Raab et al. |
| 7,302,763 | B1 | * | 12/2007 | Matthews ........... E04G 21/1891 |
| | | | | 33/451 |
| 7,313,872 | B1 | * | 1/2008 | Nygard .................... E04F 21/22 |
| | | | | 33/465 |
| 8,082,120 | B2 | | 12/2011 | St-Pierre et al. |
| 9,914,277 | B2 | * | 3/2018 | Davies ...................... B43L 7/14 |
| 2001/0052189 | A1 | * | 12/2001 | Kreisler .................... B43L 7/10 |
| | | | | 33/473 |
| 2003/0014876 | A1 | * | 1/2003 | Goldie ...................... G01B 3/16 |
| | | | | 33/558.02 |

\* cited by examiner

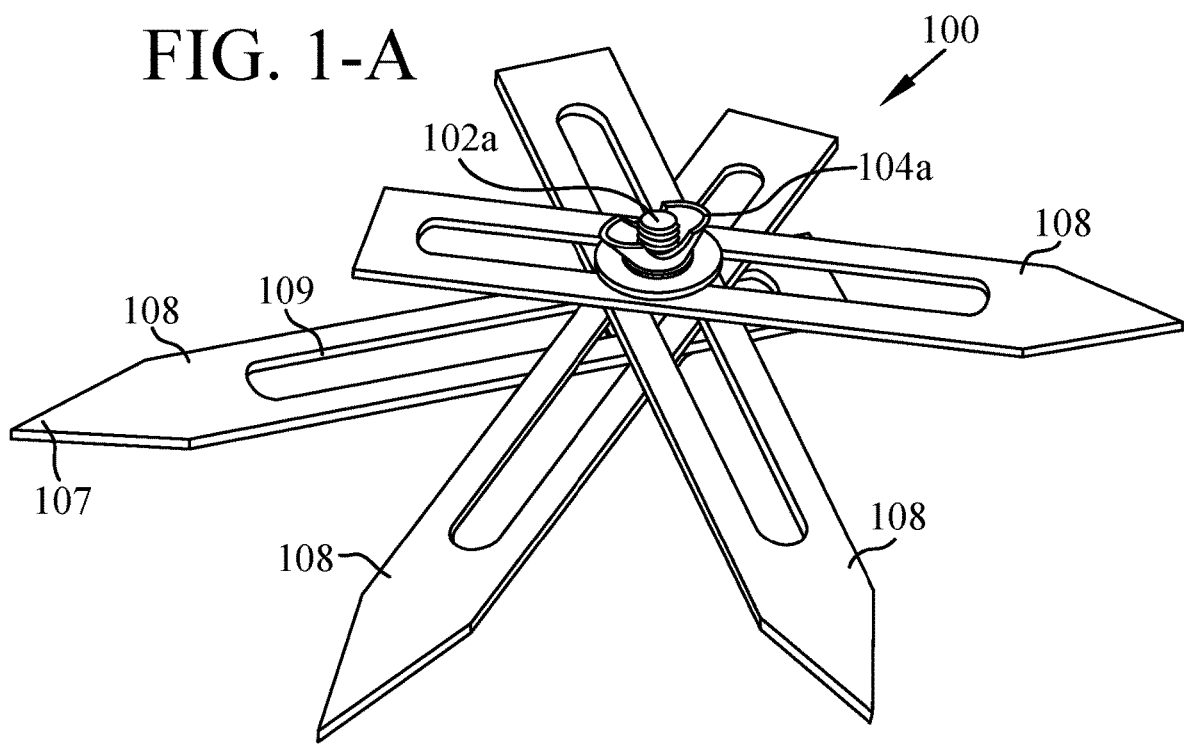
FIG. 1-A
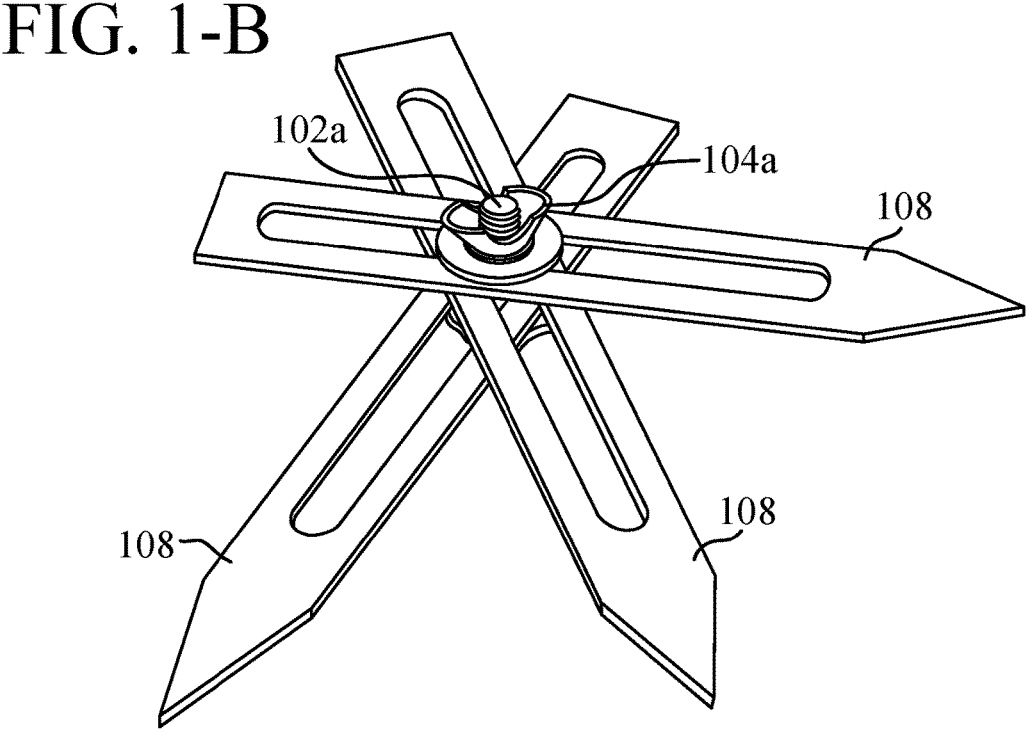
FIG. 1-B

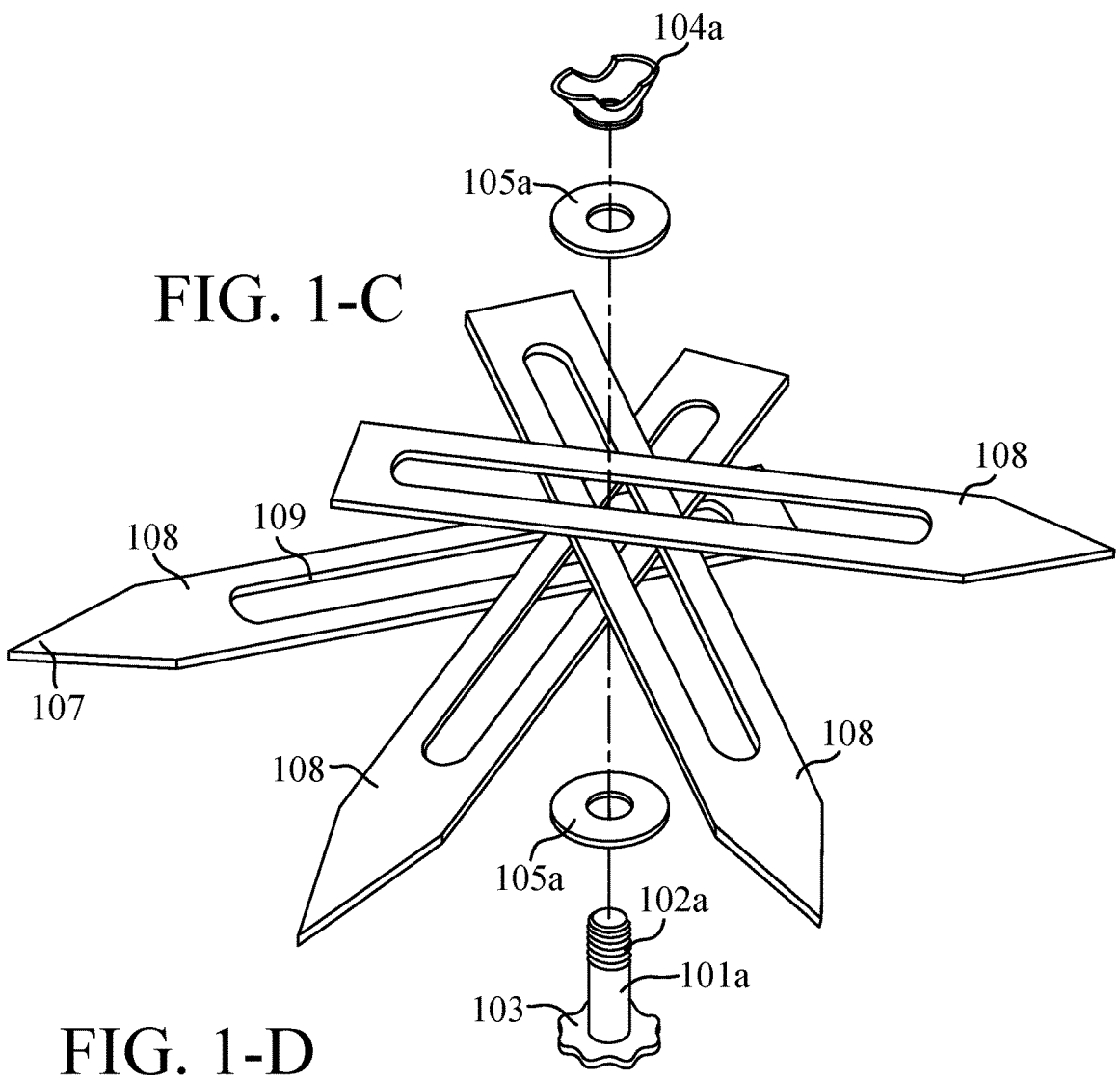
FIG. 1-C
FIG. 1-D
FIG. 1-E
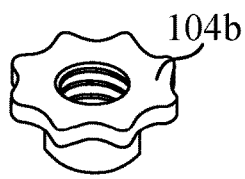
FIG. 1-F

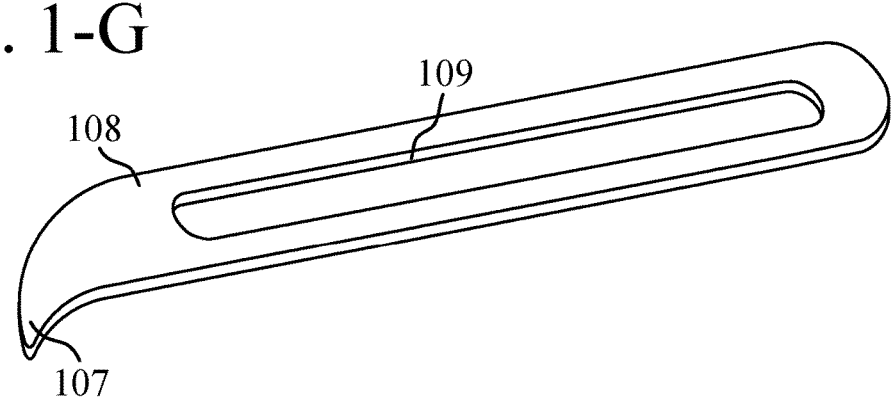
FIG. 1-G
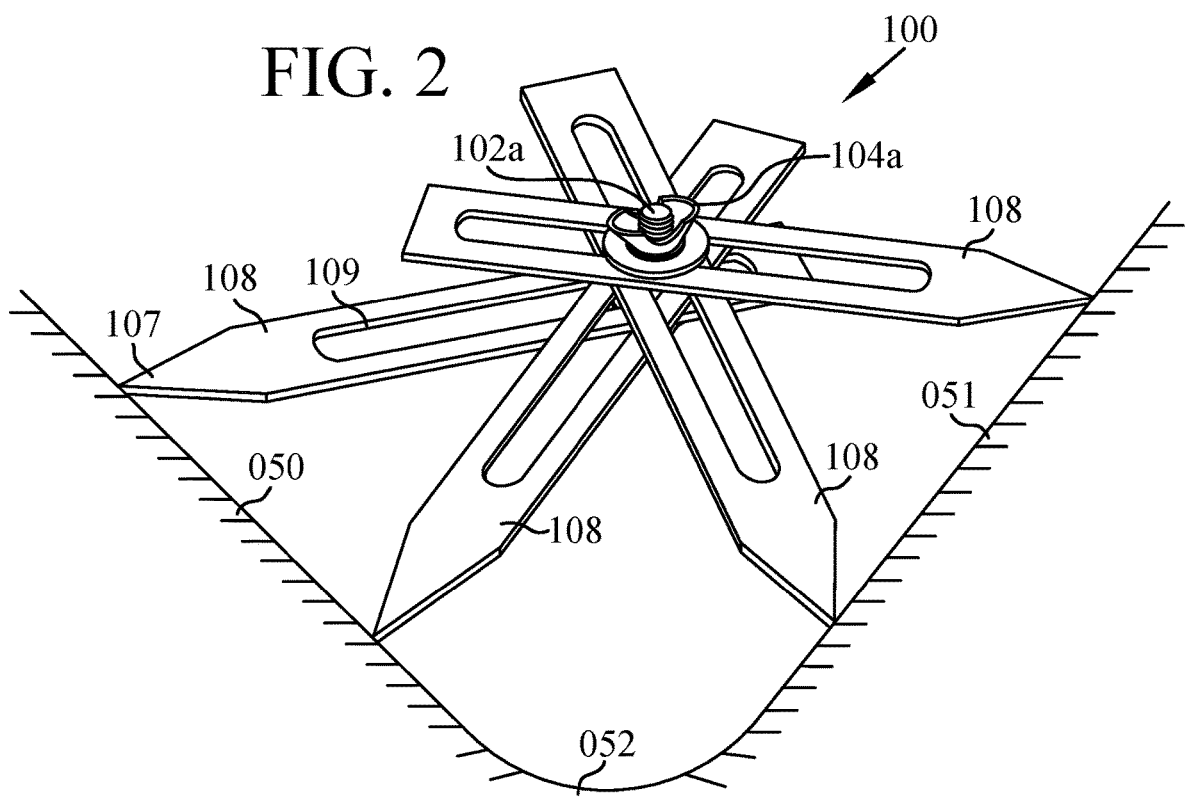
FIG. 2

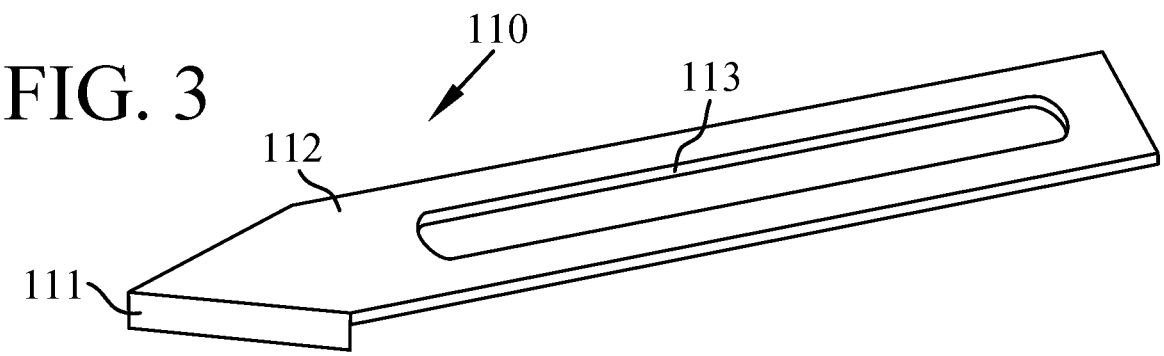
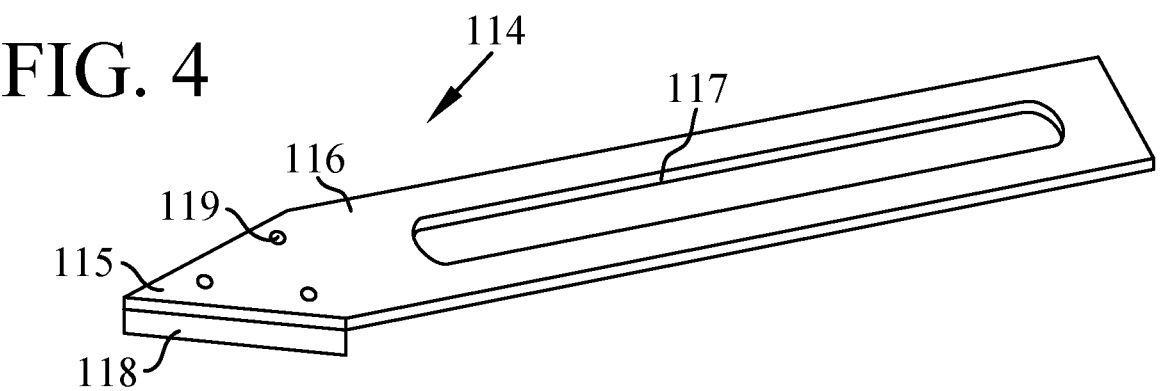
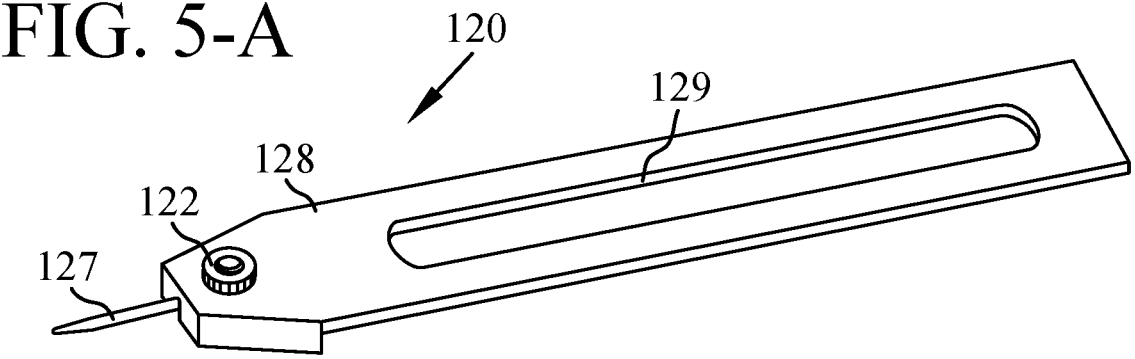

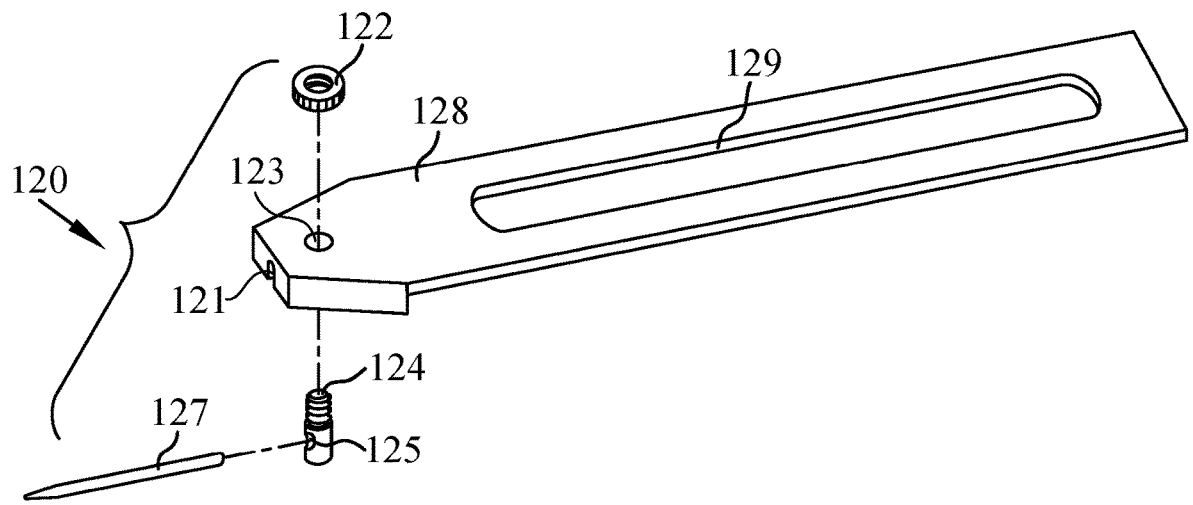
FIG. 5-B
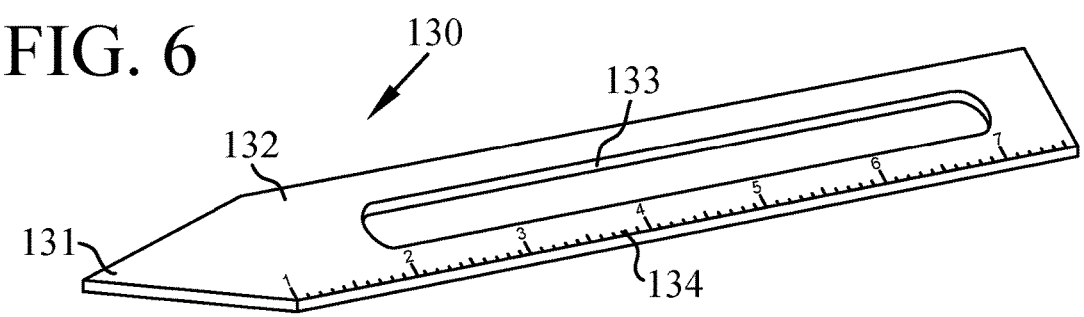
FIG. 6
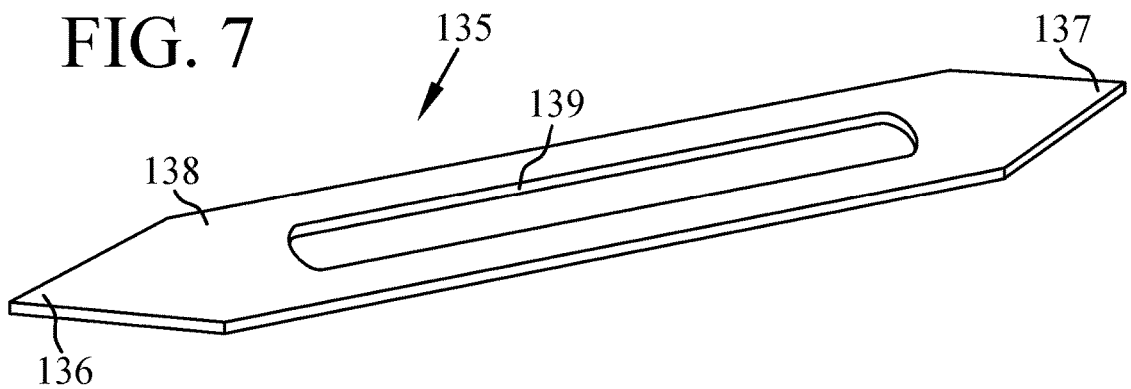
FIG. 7

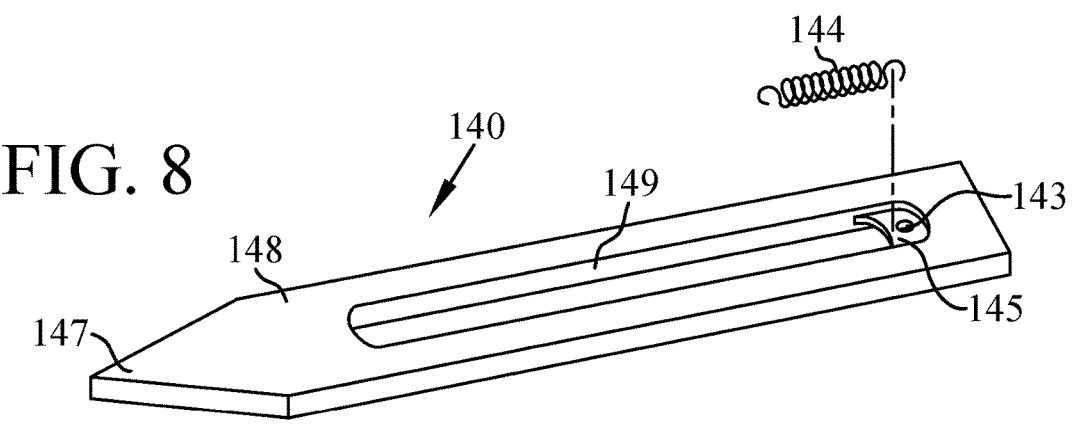
FIG. 8
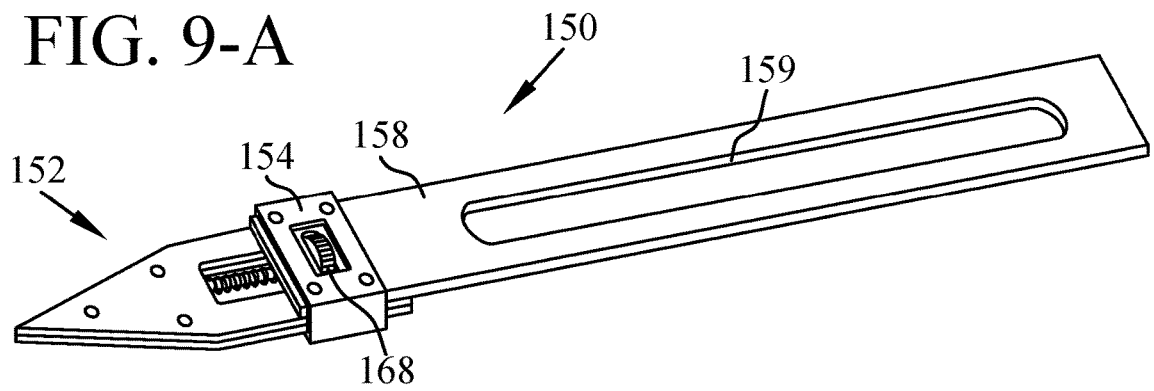
FIG. 9-A
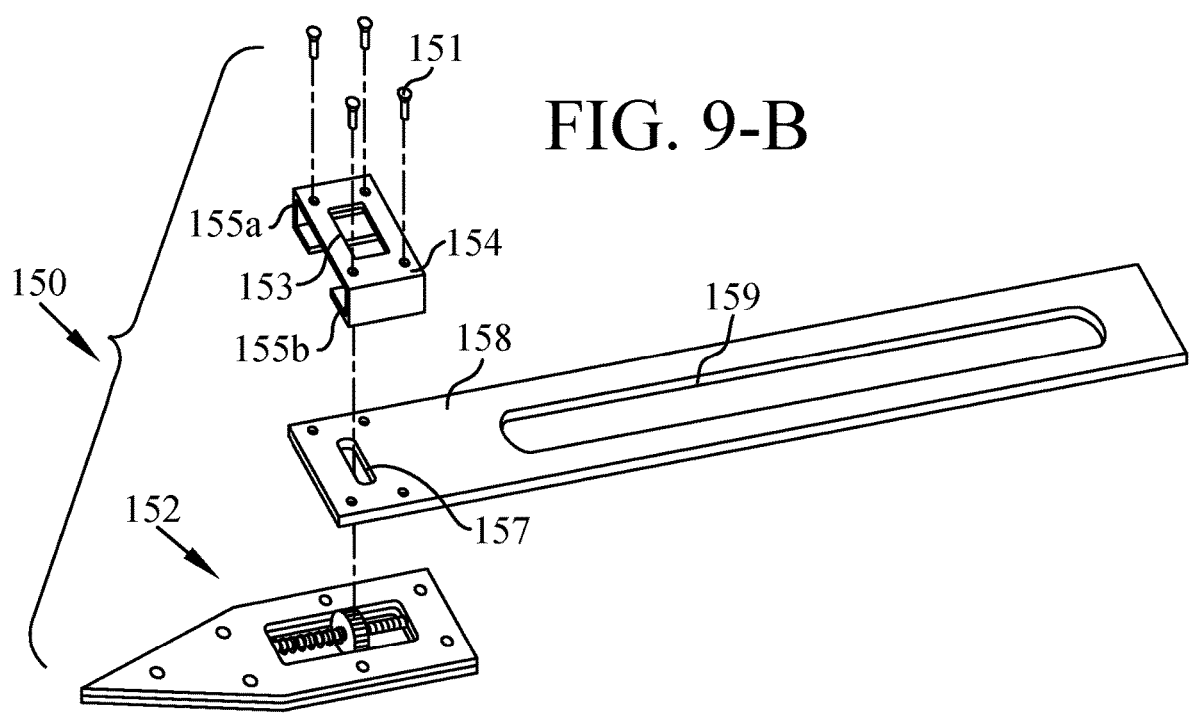
FIG. 9-B

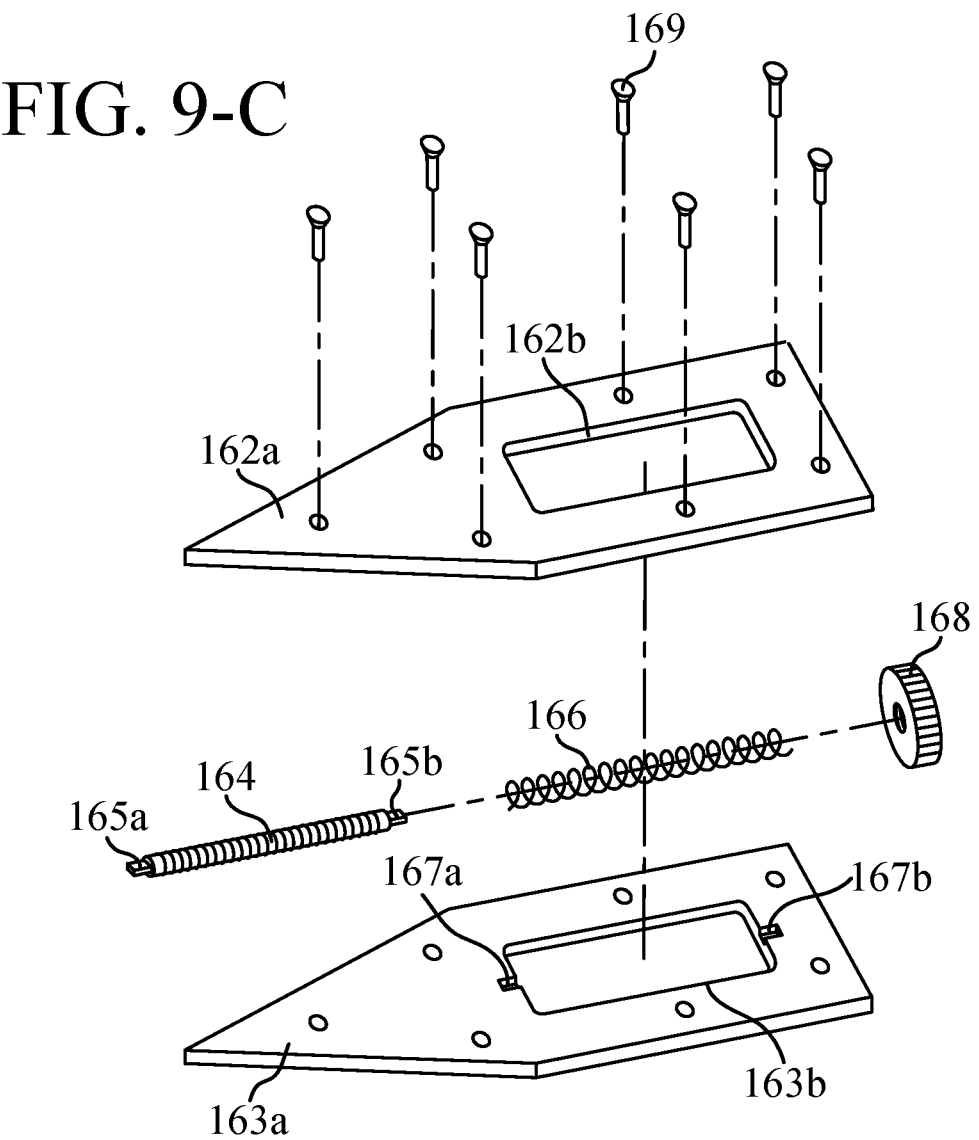
FIG. 9-C

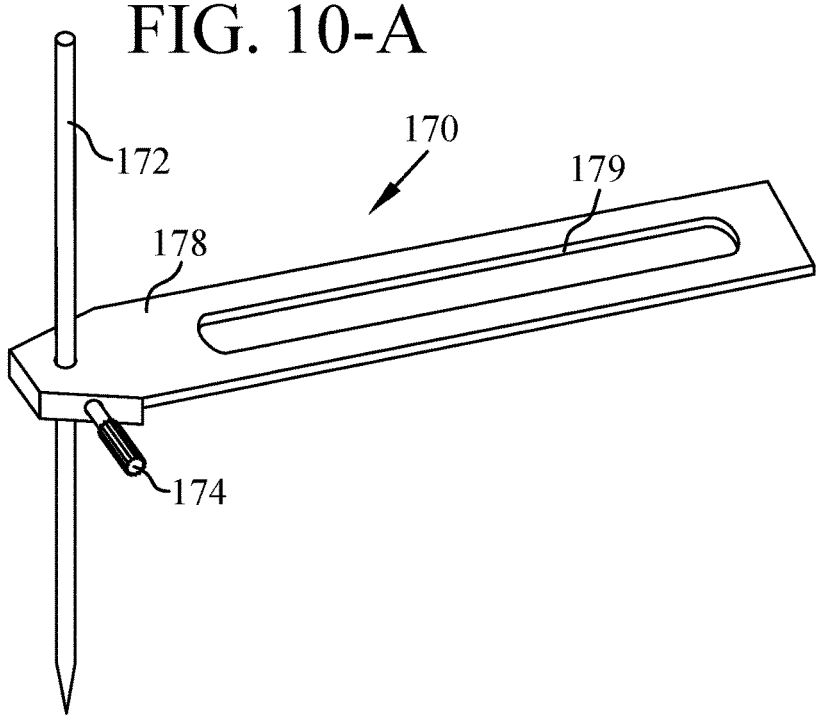
FIG. 10-A
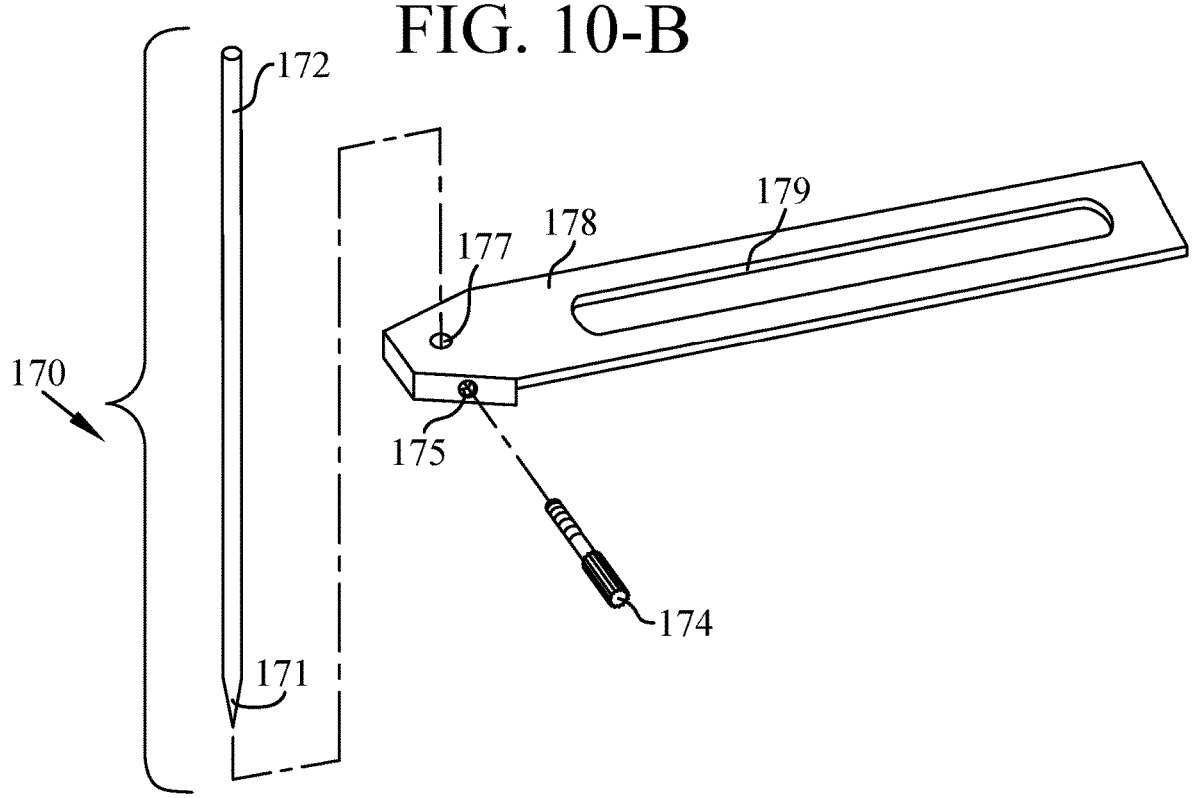
FIG. 10-B

FIG. 11-A
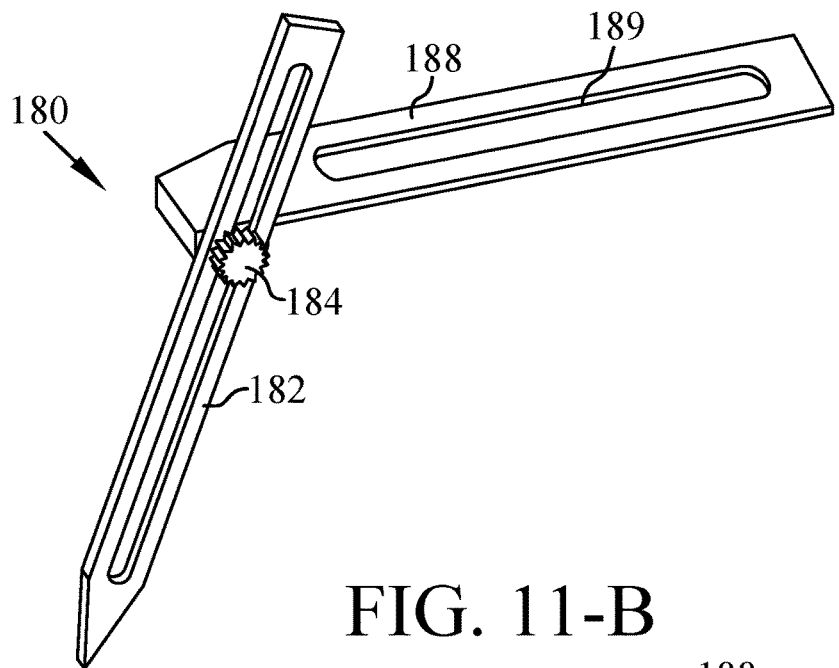
FIG. 11-B
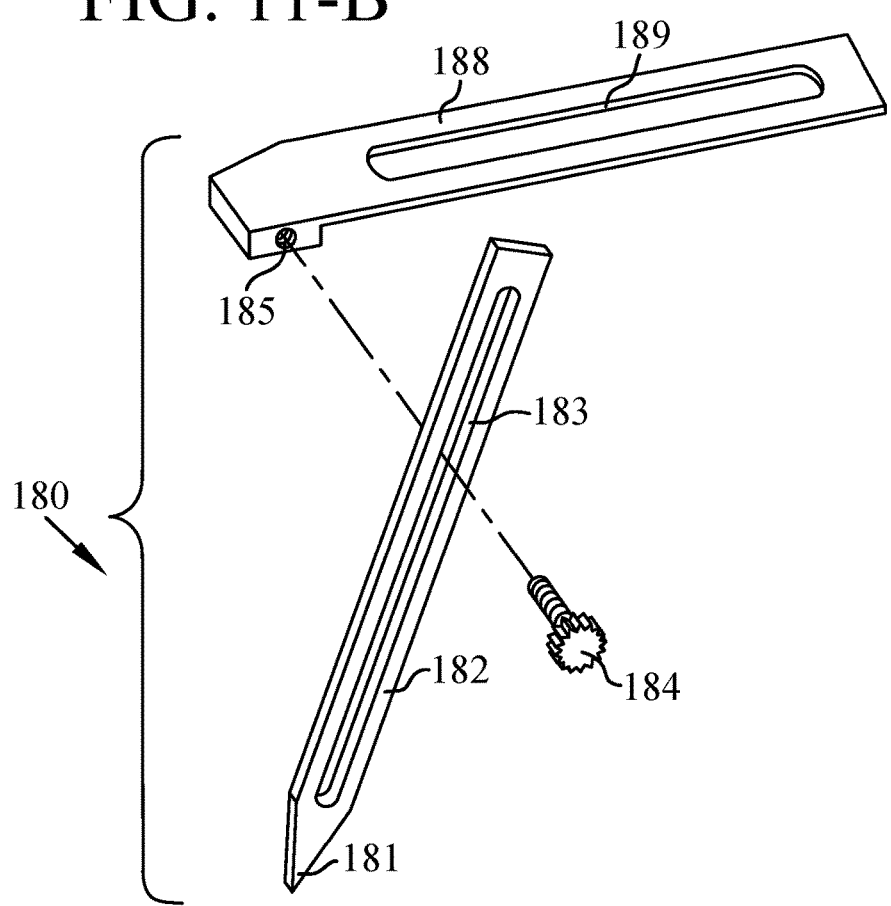

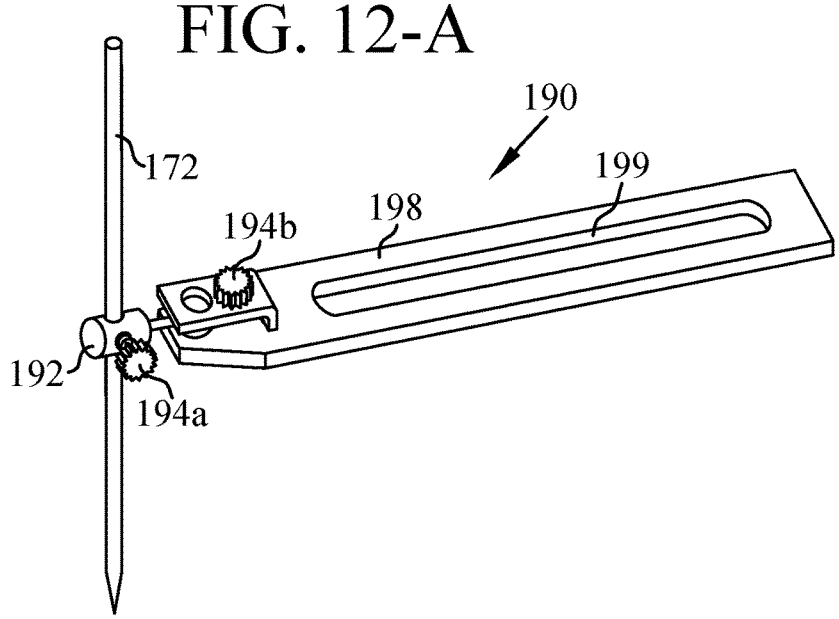
FIG. 12-A
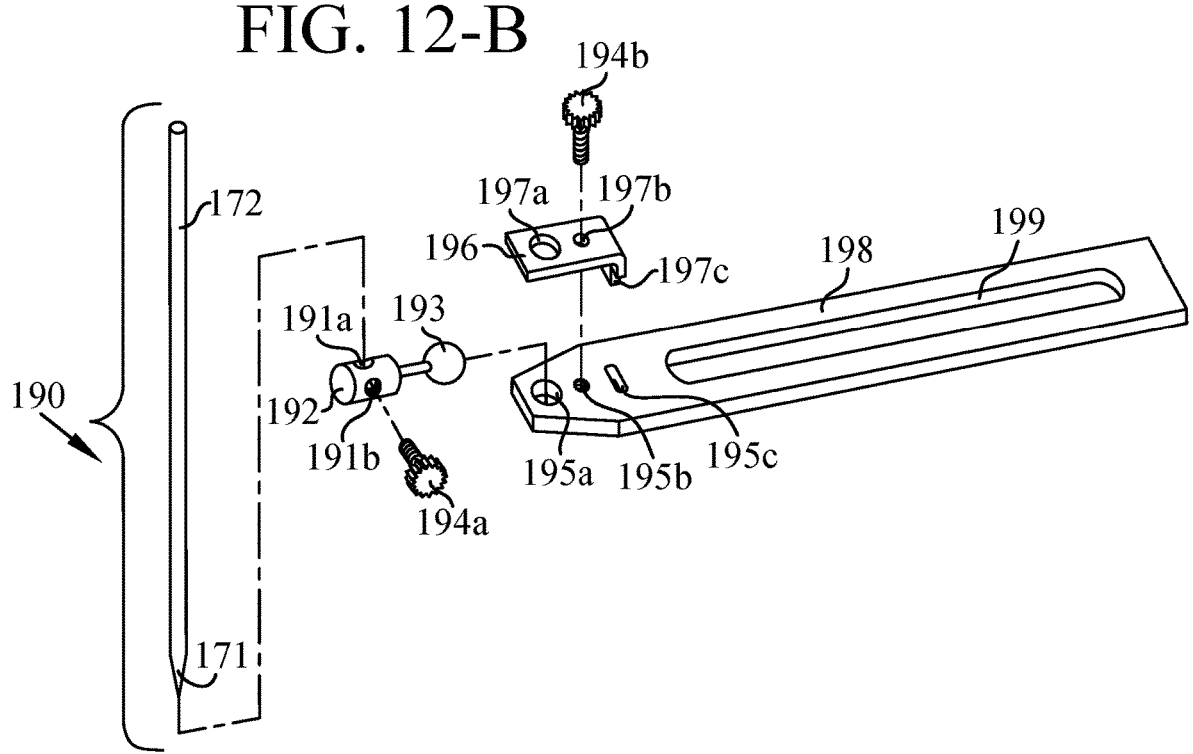
FIG. 12-B

FIG. 13-A
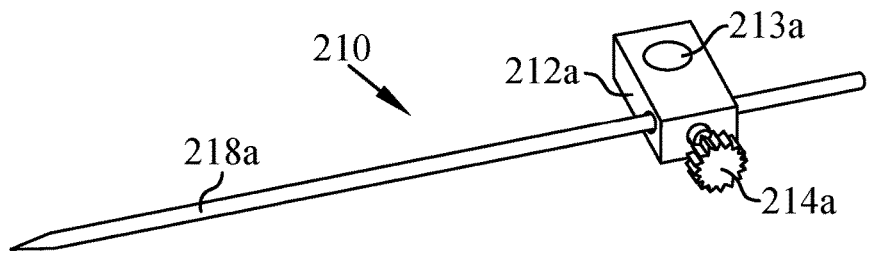
FIG. 13-B
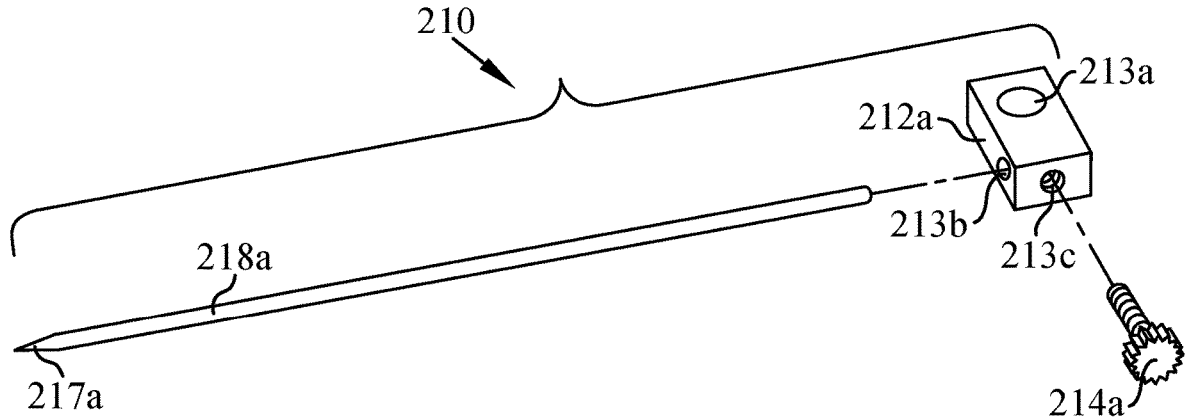
FIG. 13-C
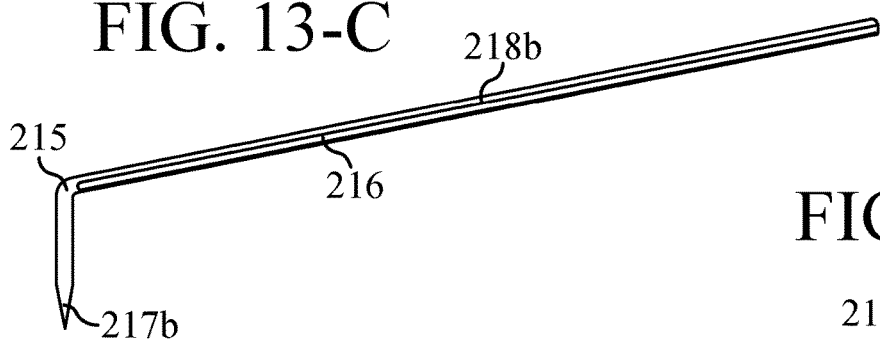
FIG. 13-D
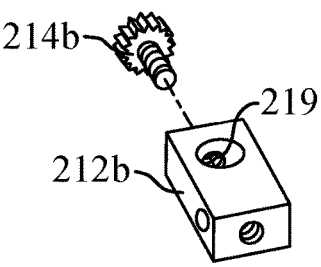

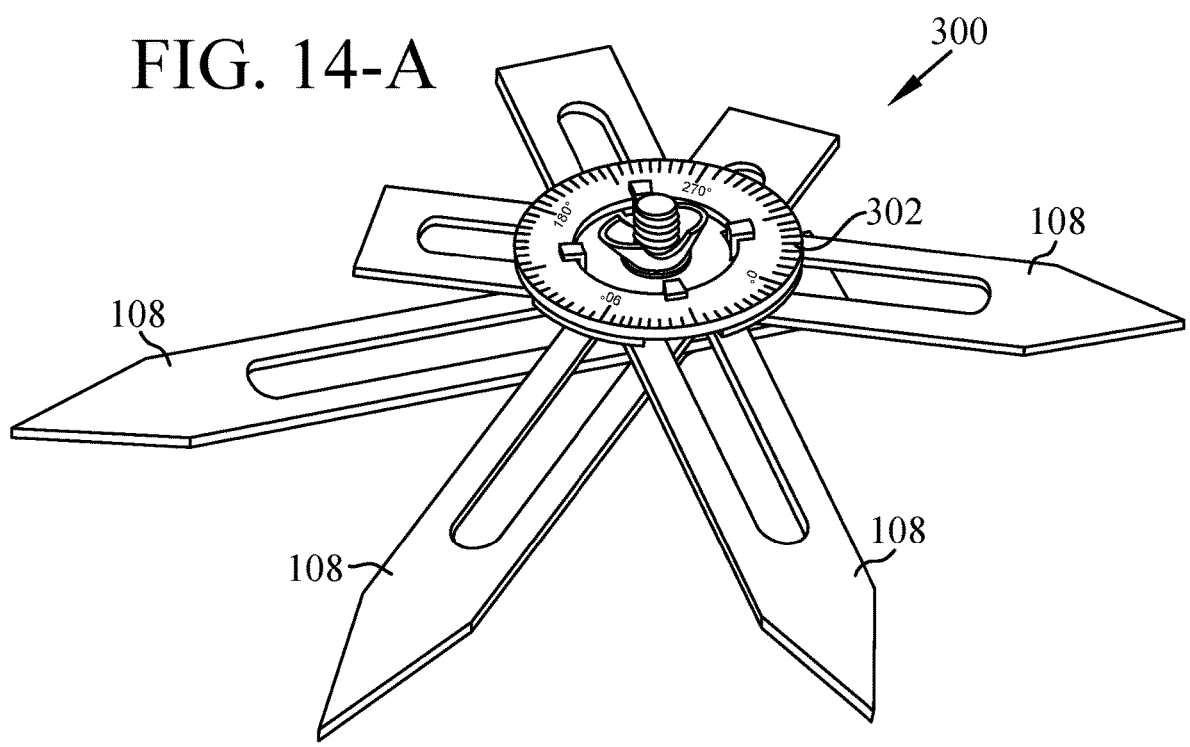
FIG. 14-A

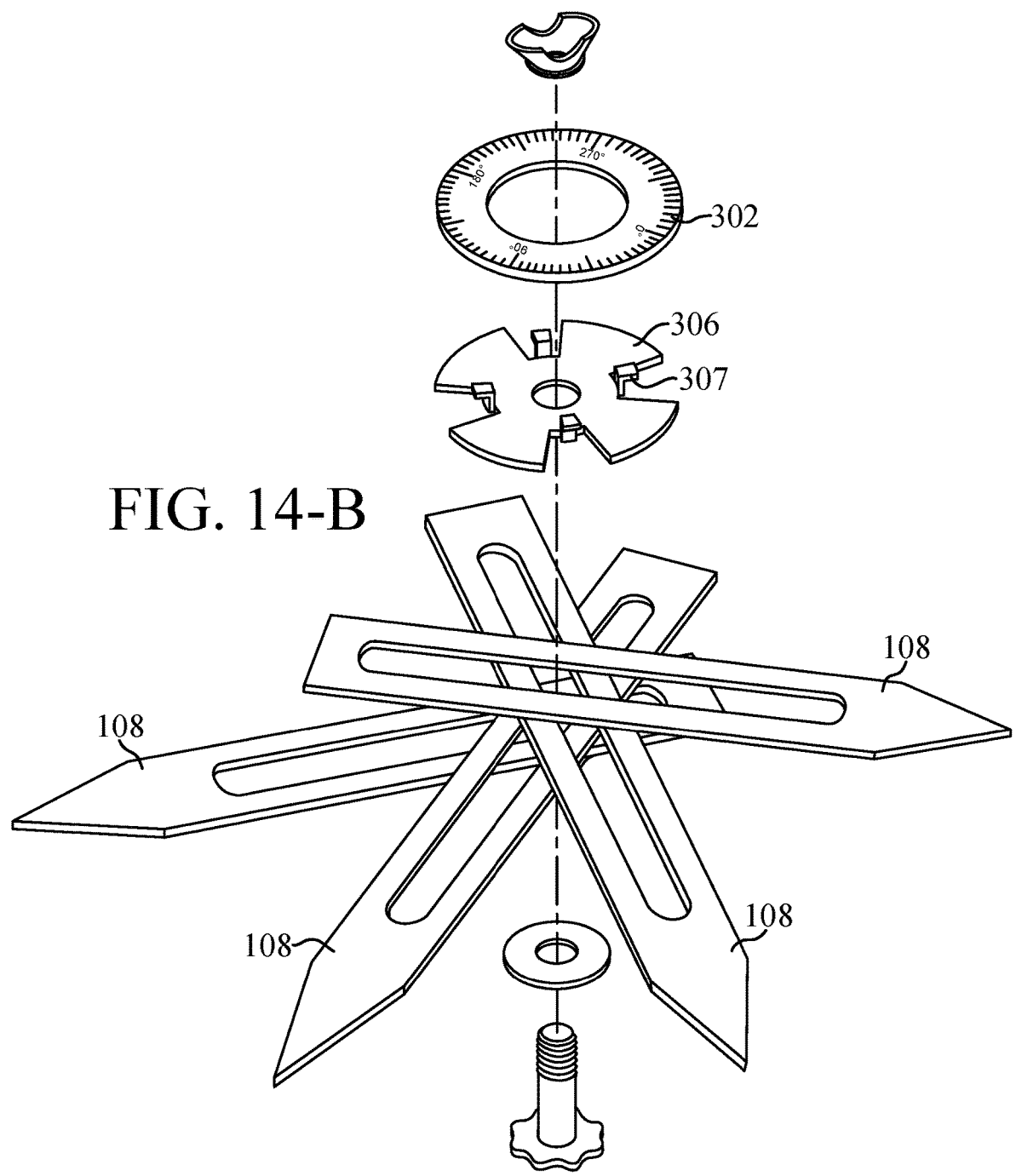
FIG. 14-B

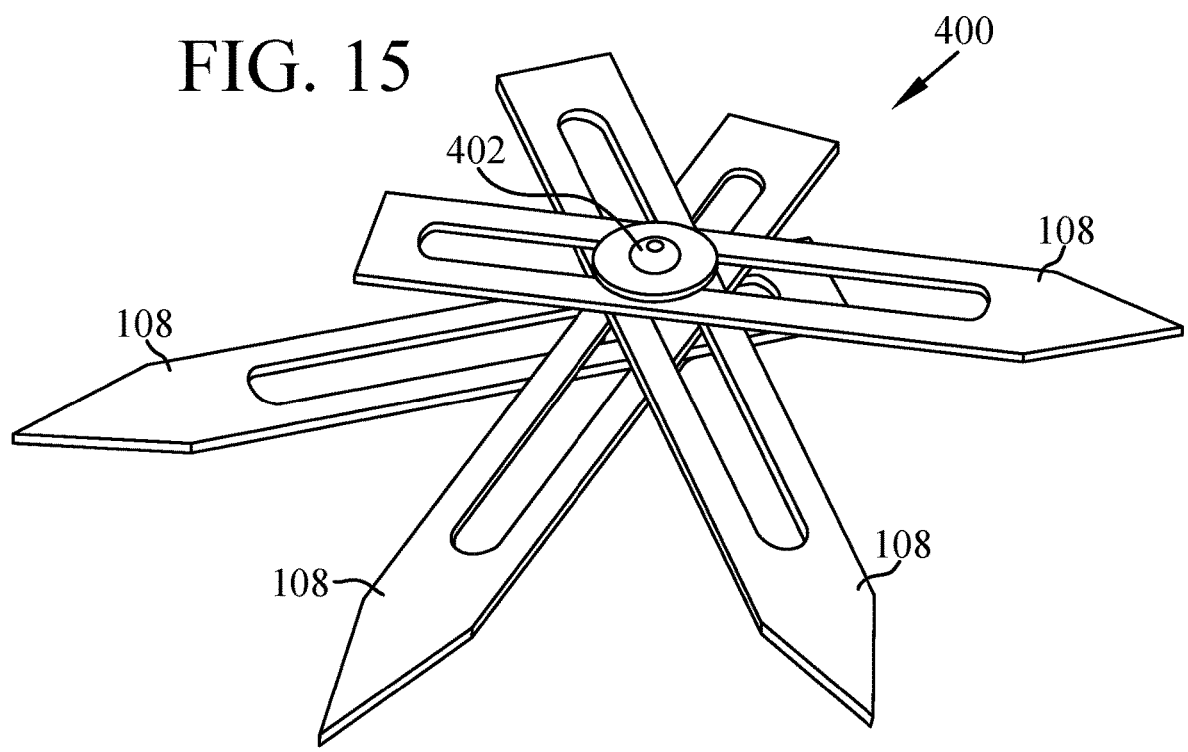
FIG. 15
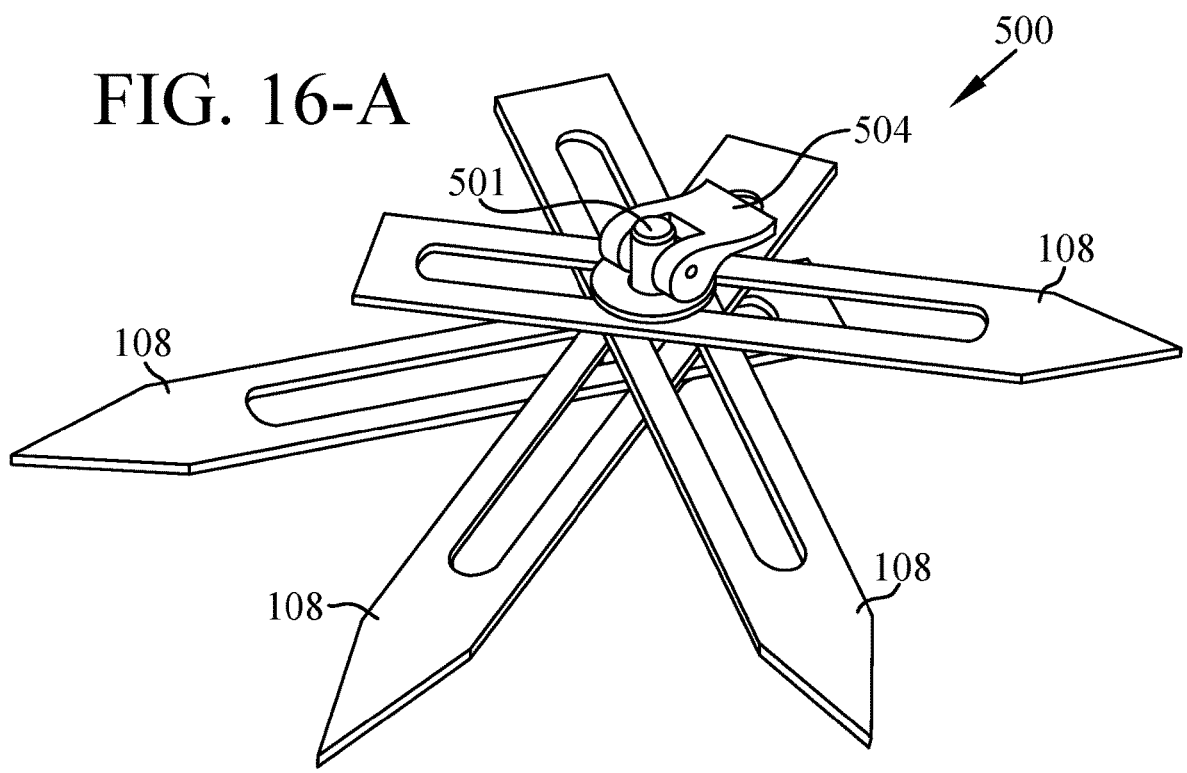
FIG. 16-A

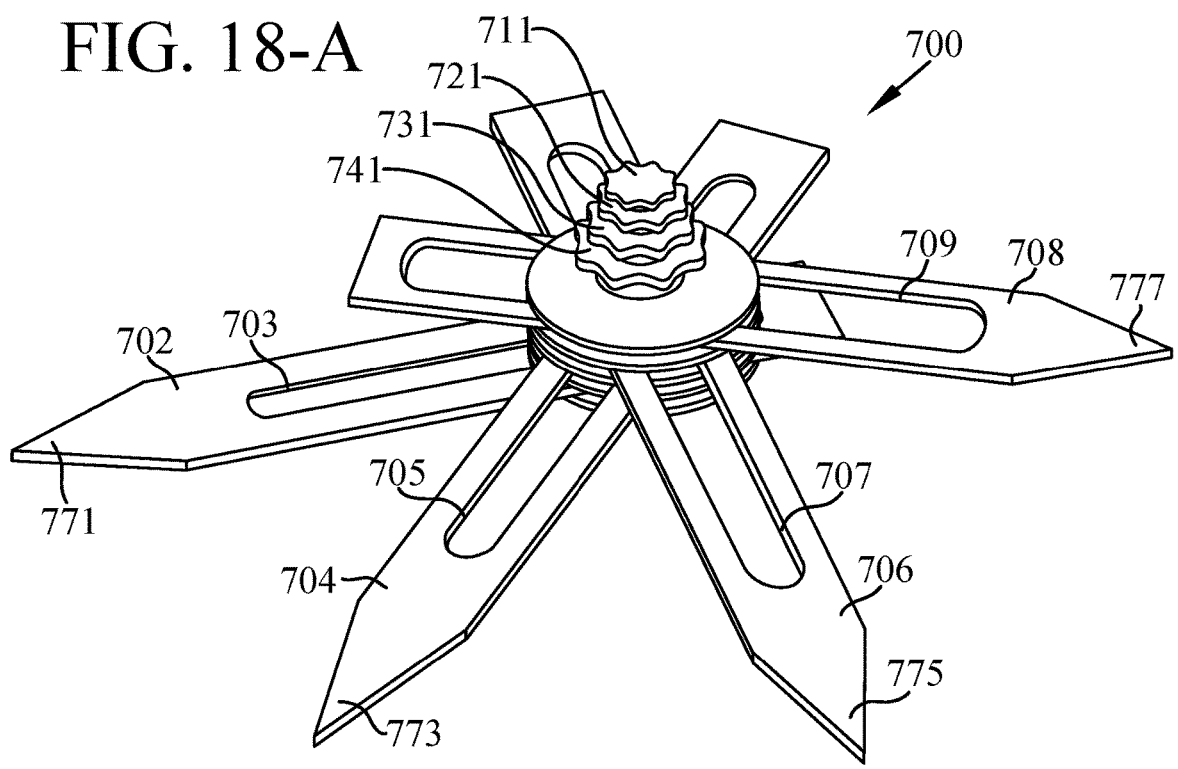
FIG. 18-A
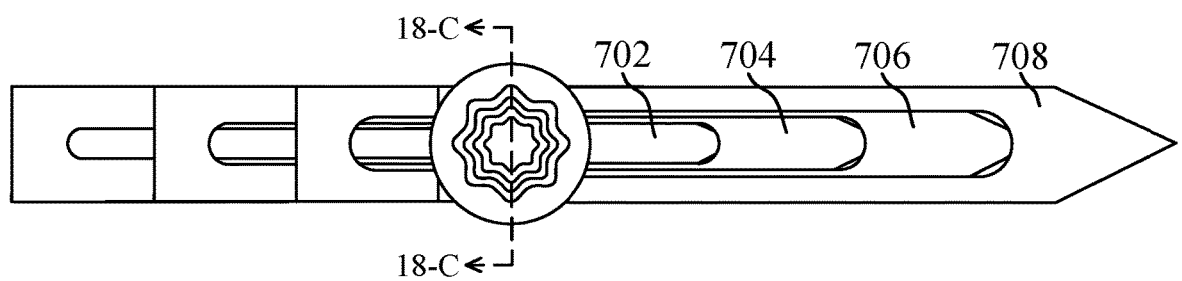
FIG. 18-B

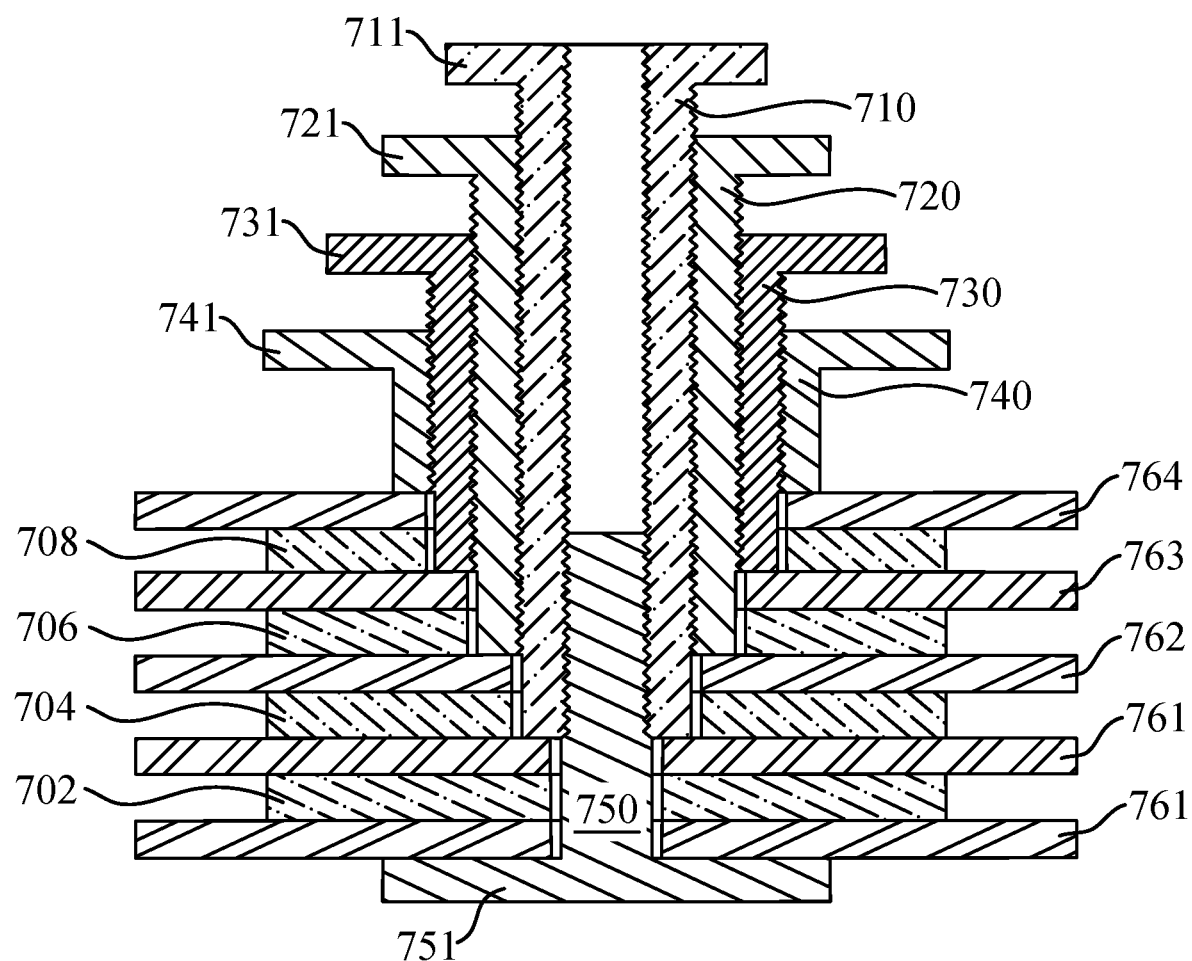
FIG. 18-C

FIG. 18-D
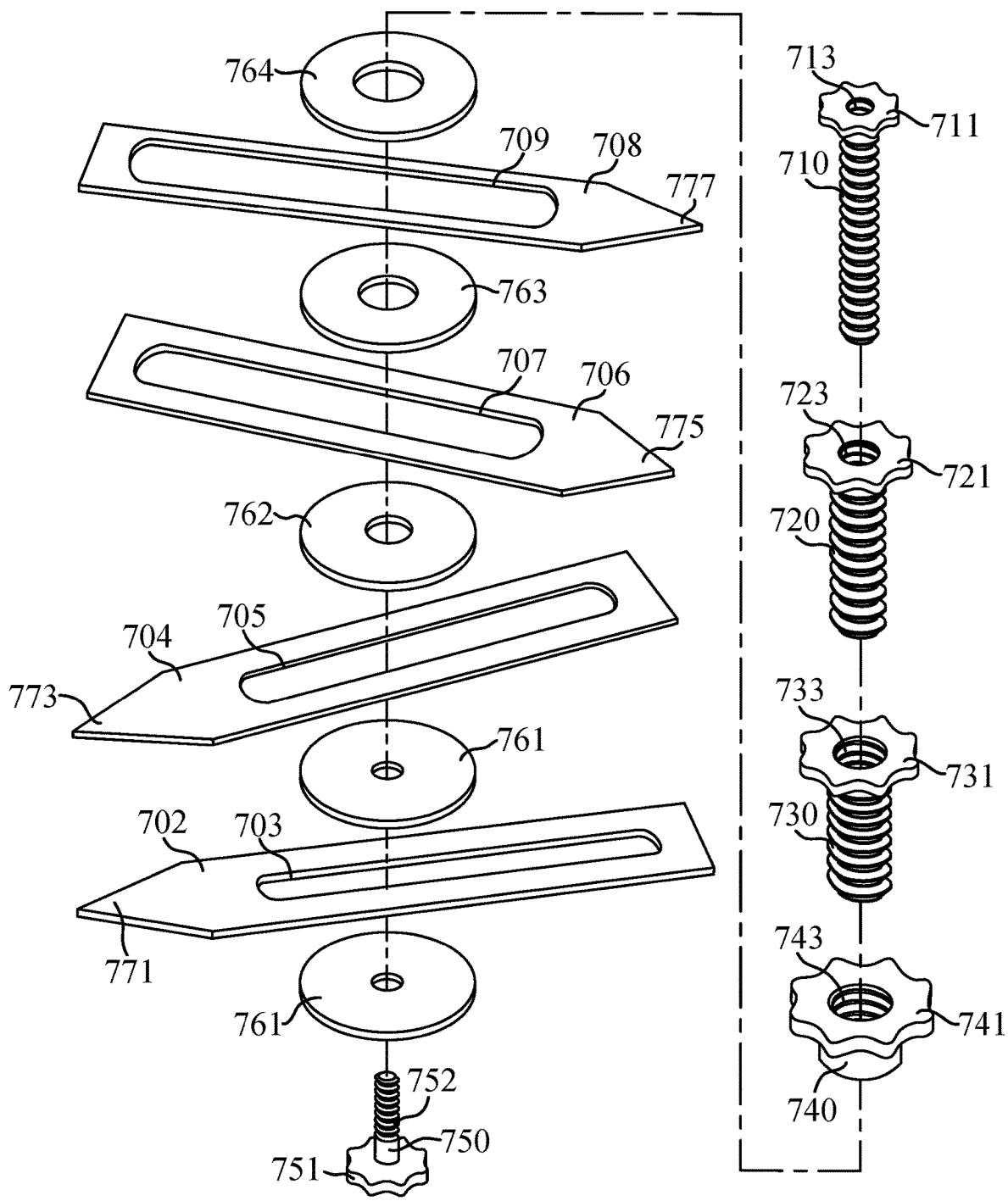

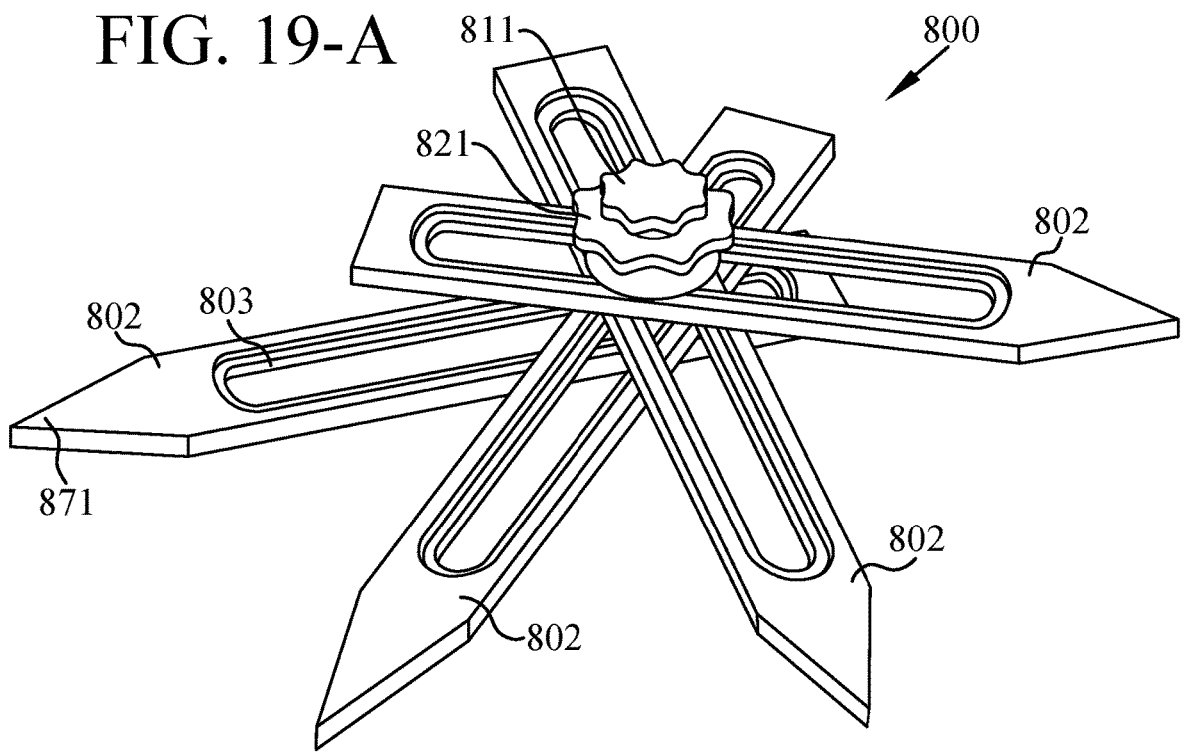
FIG. 19-A
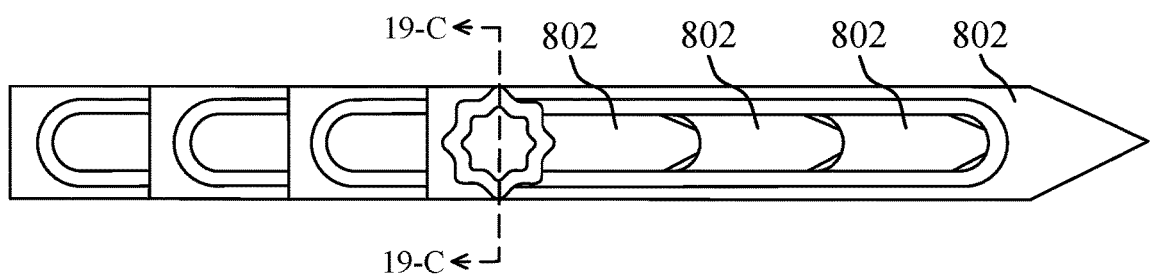
FIG. 19-B

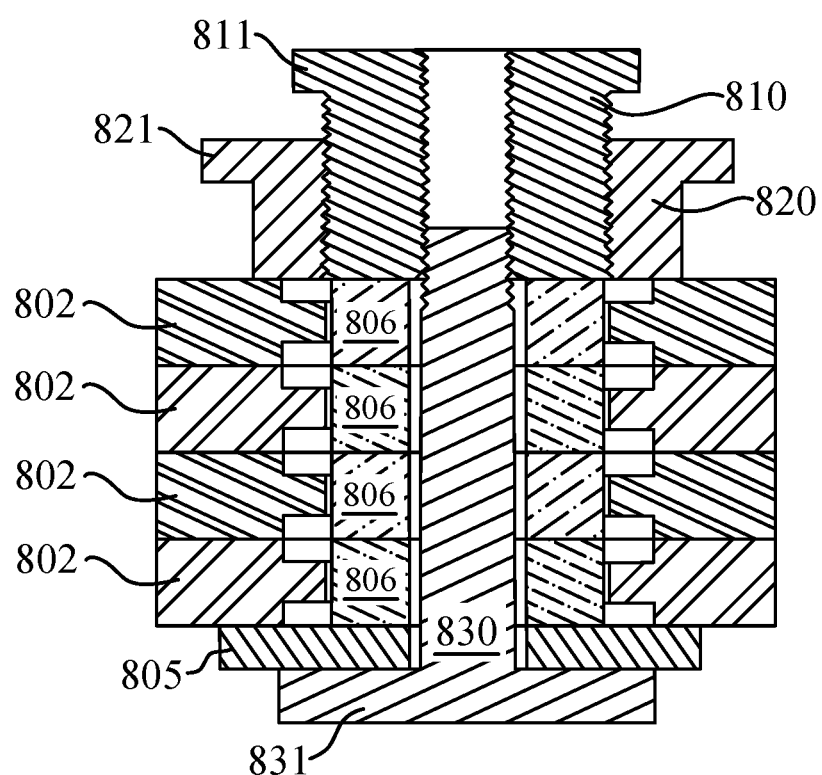
FIG. 19-C

FIG. 19-D
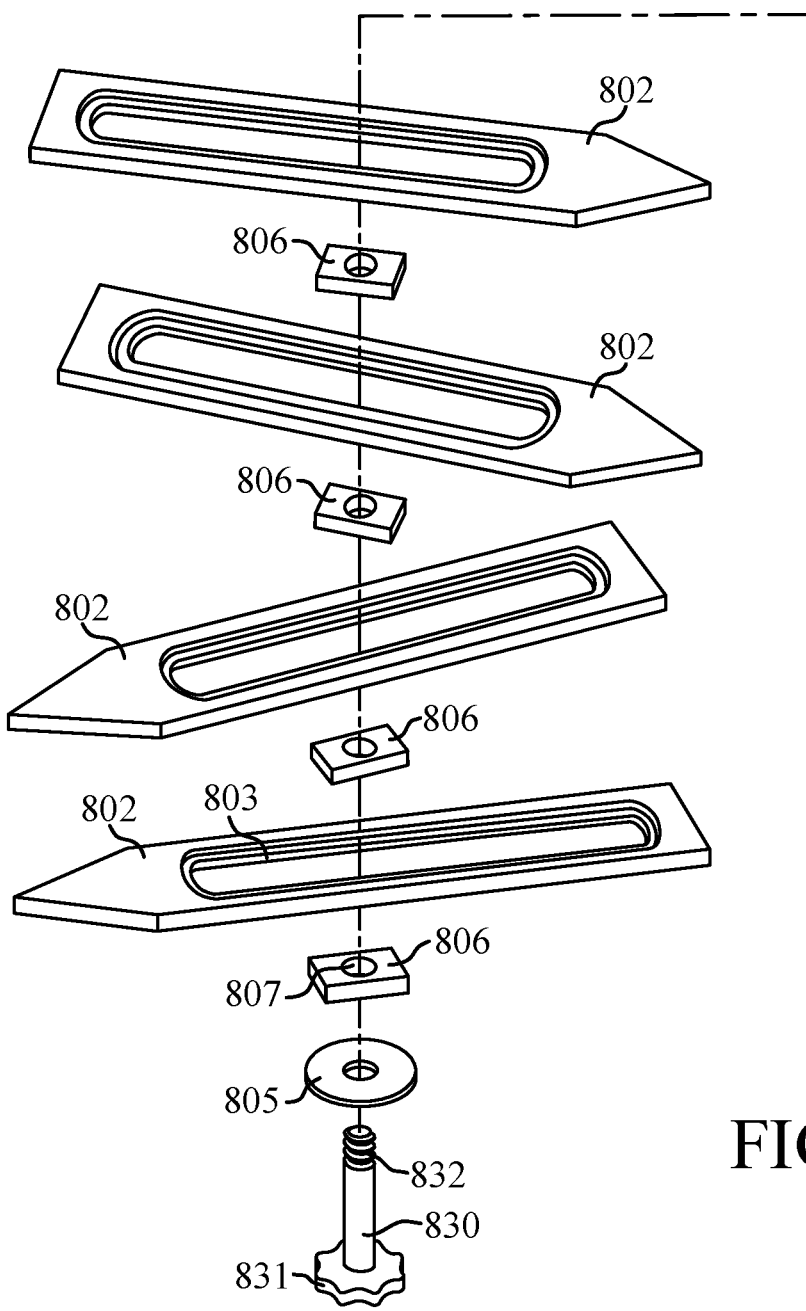
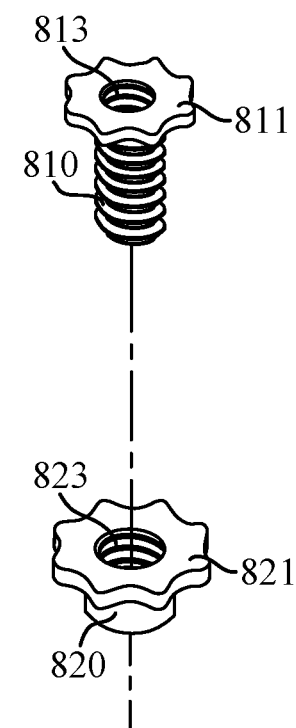
FIG. 19-E
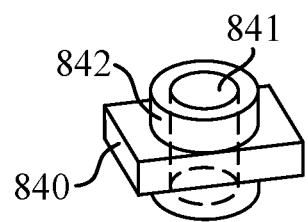

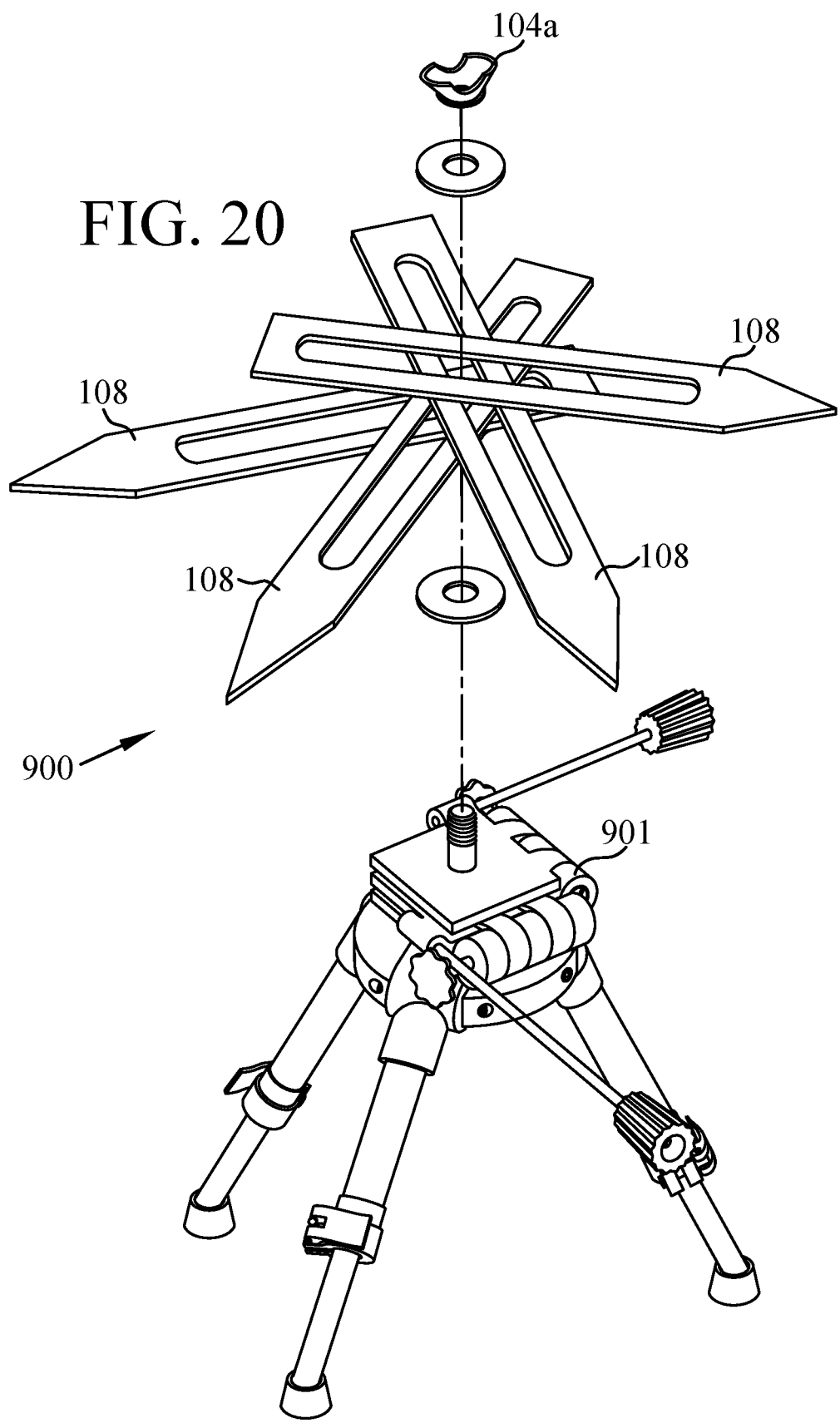

GEOMETRIC TOOL

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

Embodiments of this invention relate to geometric tools for use in the fields of drafting, manufacturing, carpentry, and navigation. More particularly, embodiments of this invention relate to a means for capturing the relative positions of points on a geometric profile, thus creating a template for use in geometric representation and replication.

Prior Art

Many craftsmen often wish to capture and replicate geometric profiles associated with physical specimens. Throughout history, numerous geometric tools and methods that attempt to serve such a purpose have come into existence. Examples of such geometric tools are measuring squares, protractors, calipers, profile gauges, digital coordinate measurement machines, and optical scanners. However, the aforementioned geometric tools possess various limitations.

Geometric tools possessing the functionality of measurement squares and/or swinging arm protractors are commonly used to capture and replicate two-dimensional geometric profiles. In order to do so, these geometric tools are used to individually capture and replicate arbitrary points on the profile, either in terms of Cartesian coordinates or polar coordinates, relative to a reference point. U.S. Pat. No. 6,978,550 (Xieh) and U.S. Pat. No. 5,669,149 (Meitzler) are both examples of such inventions. Both combine two pivotally connected arms, each being marked with length gauges, with the ability to pivot the arms to a specific angle. Meitzler's invention and Xieh's invention may be simple and reliable, however, they can only be used to capture and replicate one point at a time, which renders them inefficient when the user wishes to capture and replicate numerous points on a geometric profile. Also, these tools can be too bulky to use in confined locations, and require the user to read and record the values of intricate gauges.

Calipers are another common tool used to capture and replicate two-dimensional geometric profiles. This is typically done by first designating two reference points on or near the profile of interest, and subsequently capturing the distances of arbitrary points on the two-dimensional profile to each of the two reference points. These points are then replicated by using the well-known geometric intersection technique based on the replicated reference points. This process is then repeated until enough points which accurately define the two-dimensional geometric profile have been replicated. Several types of caliper embodiments exist which can be used to implement this method, including U.S. Pat. No. 337,531 (Stevens) and U.S. Pat. No. 2,846,769 (Colont), however, they too prove to be inefficient at capturing and replicating multiple points.

Profile gauges are geometric tools designed to capture and represent the shape of complex two-dimensional geometric profiles by utilizing a multitude of probing rods or blades. One embodiment of a profile gauge can be found in U.S. Pat. No. 4,715,124 (Harrington). However, like most profile gauges, it is complex and comprises numerous parts. In addition, profile gauges of present day are typically limited in size and cannot capture geometric profiles having height variations of more than a few inches.

Digital coordinate measurement machines such as U.S. Pat. No. 7,269,910 (Raab et al.) and optical scanners such as U.S. Pat. No. 8,082,120 (St-Pierre et al.) are modern tools used to quickly capture and reproduce three-dimensional geometric profiles. However, as of today, these tools are extremely expensive, require a high-performance computer, and necessitate in-depth training for the user.

All the geometric tools designed to aid in capturing and replicating geometric profiles heretofore known suffer from a number of disadvantages:

(a.) Measurement squares having gauged arms used to capture and replicate the Cartesian coordinates of points are often cumbersome and time-consuming to use.

(b.) Likewise, protractors having swinging gauged arms used to capture and replicate the polar coordinates of points are also cumbersome and time-consuming to use.

(c.) The use calipers used in conjunction with the geometric intersection technique is a time-consuming process.

(d.) Typical profile gauges in present use are complex and can only be used for small scale geometric profiles.

(e.) Although digital coordinate measurement machines having a probing arm are efficient and accurate, they are bulky, expensive, and require a power source and a computer in order to operate.

(f.) Optical scanners are also bulky, expensive, and require a power source and a computer in order to operate. Also, optical scanners in present use can only be used to scan objects having limited classes of surface textures.

Objects and Advantages

Accordingly, several objects and advantages of the present invention are:

(a.) to provide a geometric tool that can instantly and simultaneously capture the relative positions of multiple points on geometric profiles without the need for reading gauges and using coordinate systems, thus creating a template for use in geometric representation and replication;

(b.) to provide a geometric tool that has a compact size for use in confined areas;

(c.) to provide a geometric tool that is simple and inexpensive to manufacture;

(d.) to provide a geometric tool that requires minimal user training;

(e.) to provide a geometric tool that does not require an electrical power source in order to operate; and (f.) to provide a geometric tool that does not require a computer in order to operate.

Further objects and advantages will become apparent from a consideration of the ensuing description and drawings.

SUMMARY

In accordance with the present invention, a geometric tool comprises a hub member, three or more pointers adapted to freely pivot and radially translate with respect to the hub member, and a means for a user to optionally lock the pivoting and radial translation motion of the pointers with respect to the hub member, whereby the user can probe the relative positions of arbitrary points on a geometric profile with the tips of the pointers, and subsequently lock the pointers in place, thereby creating a template for use in geometric representation and replication.

DRAWINGS

Figures

FIG. 1-A is a top isometric view of the preferred embodiment of the geometric tool in accordance with the present invention;

FIG. 1-B is a top isometric view of an alternate embodiment featuring only three pointers;

FIG. 1-C is a top isometric exploded view of the embodiment shown in FIG. 1-A;

FIG. 1-D is a top isometric view of a holed plate spring;

FIG. 1-E is a top isometric view of an alternate nut featuring an ergonomic geometry;

FIG. 1-F is a top isometric view of an alternate hub member featuring a hollow threaded shaft;

FIG. 1-G is a top isometric view of a pointer featuring an alternate tip geometry;

FIG. 2 is a top isometric view of a user application of the embodiment shown in FIG. 1-A;

FIG. 3 is a top isometric view of an alternate pointer featuring a thickened tip;

FIG. 4 is a top isometric view of an alternate pointer featuring a thickened member attached beneath the tip;

Figure 16:
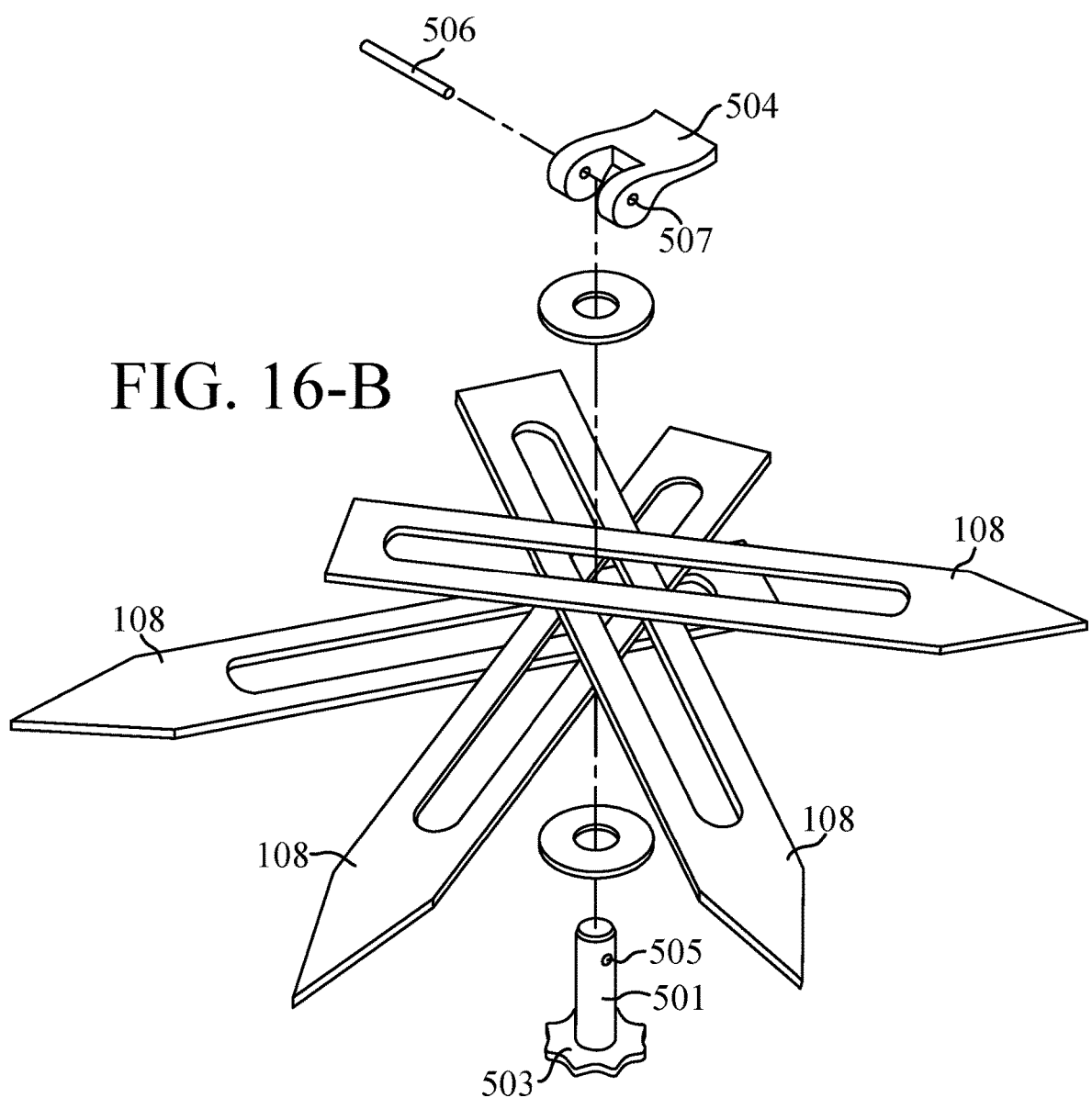
Figure 17:
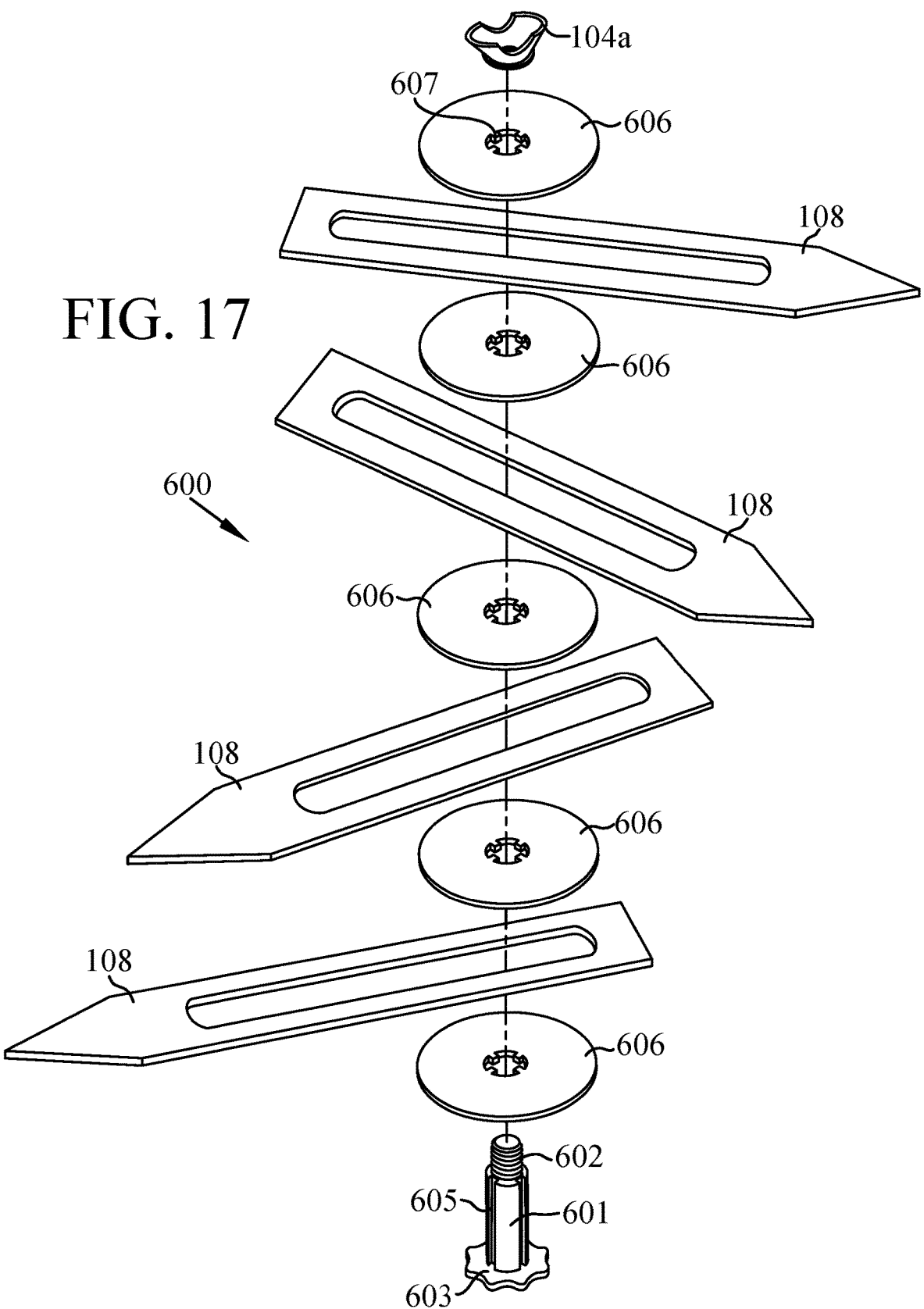
Figure 21:
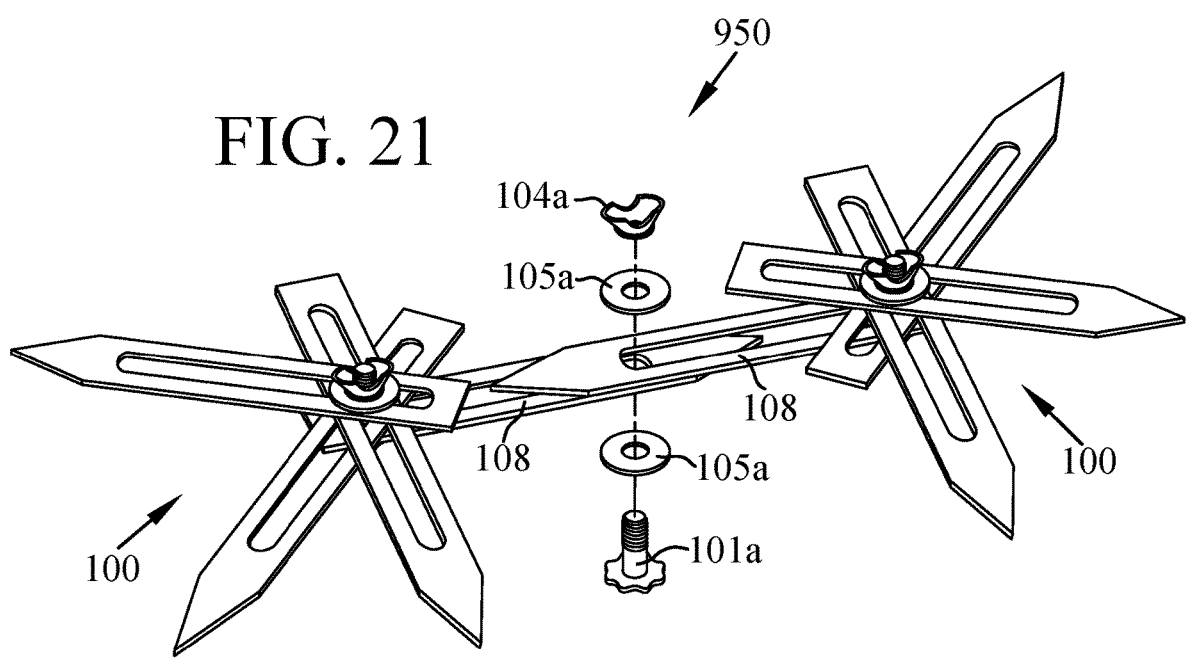

FIG. 5-A is a top isometric view of an alternate pointer featuring a pin;

FIG. 5-B is a top isometric exploded view of the pointer shown in FIG. 5-A;

FIG. 6 is a top isometric view of an alternate pointer featuring a length gauge;

FIG. 7 is a top isometric view of an alternate pointer featuring a second tip;

FIG. 8 is a top isometric exploded view of an alternate pointer featuring an axial tension spring;

FIG. 9-A is a top isometric view of an alternate pointer featuring an extensible tip;

FIG. 9-B is a top isometric exploded view of the pointer shown in FIG. 9-A;

FIG. 9-C is a top isometric exploded view of the extensible tip shown in FIG. 9-B;

FIG. 10-A is a top isometric view of an alternate pointer featuring a slidable rod;

FIG. 10-B is a top isometric exploded view of the pointer shown in FIG. 10-A;

FIG. 11-A is a top isometric view of an alternate pointer featuring a swinging longitudinal member;

FIG. 11-B is a top isometric exploded view of the pointer shown in FIG. 11-A;

FIG. 12-A is a top isometric view of an alternate pointer featuring a slidable rod and a ball-and-socket joint;

FIG. 12-B is a top isometric exploded view of the pointer shown in FIG. 12-A;

FIG. 13-A is a top isometric view of an alternate pointer comprising a holed member and a slidable rod;

FIG. 13-B is a top isometric exploded view of the pointer shown in FIG. 13-A;

FIG. 13-C is a top isometric view of an alternate rod of the pointer shown in FIG. 13-A;

FIG. 13-D is a top isometric view of an alternate holed member of the pointer shown in FIG. 13-A;

FIG. 14-A is a top isometric view of an alternate embodiment featuring an angular gauge;

FIG. 14-B is a top isometric exploded view of the embodiment shown in FIG. 14-A;

FIG. 15 is a top isometric view of an alternate embodiment featuring a rivet;

FIG. 16-A is a top isometric view of an alternate embodiment featuring a cam lever;

FIG. 16-B is a top isometric exploded view of the embodiment shown in FIG. 16-A;

FIG. 17 is a top isometric exploded view of an alternate embodiment featuring tabbed annular disks and a grooved hub member;

FIG. 18-A is a top isometric view of an alternate embodiment featuring telescopic screw members and pointers with varying slot widths;

FIG. 18-B is a top view of the embodiment shown in FIG. 18-A with the pointers aligned;

FIG. 18-C is a section view of FIG. 18-B;

FIG. 18-D is a top isometric exploded view of the embodiment shown in FIG. 18-A;

FIG. 19-A is a top isometric view of an alternate embodiment featuring telescopic screw members and pointers with counterbored slots;

FIG. 19-B is a top view of the embodiment shown in FIG. 19-A with the pointers aligned;

FIG. 19-C is a section view of FIG. 19-B;

FIG. 19-D is a top isometric exploded view of the embodiment shown in FIG. 19-A;

FIG. 19-E is a top isometric view of an alternate member of the embodiment shown in FIG. 19-D;

FIG. 20 is a top isometric exploded view of an alternate embodiment featuring a tripod;

FIG. 21 is a top isometric exploded view of an alternate embodiment featuring the combination of two geometric tools;

| REFERENCE NUMERALS | |
|---|---|
| 050 | Wall |
| 051 | Wall |
| 052 | Fillet |
| 100 | Preferred Embodiment |
| 101a | Hub Member |
| 101b | Hub Member |
| 102a | Threaded Shaft |
| 102b | Hollow Threaded Shaft |
| 103 | Head |
| 104a | Nut |
| 104b | Nut |
| 105a | Washer |
| 105b | Holed Spring Plate |
| 106 | Extrusion |
| 107 | Tip |
| 108 | Pointer |
| 109 | Slot |
| 110 | Alternate Pointer |
| 111 | Tip |
| 112 | Longitudinal Member |
| 113 | Slot |
| 114 | Alternate Pointer |
| 115 | Tip |
| 116 | Longitudinal Member |
| 117 | Slot |
| 118 | Member |
| 119 | Rivet |
| 120 | Alternate Pointer |
| 121 | Groove |
| 122 | Nut |

-continued

| REFERENCE NUMERALS | | | REFERENCE NUMERALS | |
|---|---|---|---|---|
| 123 | Thru-Hole | | 210 | Alternate Pointer |
| 124 | Threaded Member | | 212a | Member |
| 125 | Hole | | 212b | Member |
| 127 | Pin | | 213a | Thru-Hole |
| 128 | Longitudinal Member | | 213b | Thru-Hole |
| 129 | Slot | | 213c | Threaded Hole |
| 130 | Alternate Pointer | | 214a | Screw |
| 131 | Tip | | 214b | Screw |
| 132 | Longitudinal Member | | 215 | Bend |
| 133 | Slot | | 216 | Flat Face |
| 134 | Length Gauge | | 217a | Tip |
| 135 | Alternate Pointer | | 217b | Tip |
| 136 | Tip | | 218a | Rod |
| 137 | Tip | | 218b | Rod |
| 138 | Longitudinal Member | | 219 | Threaded Hole |
| 139 | Slot | | 300 | Alternate Embodiment |
| 140 | Alternate Pointer | | 302 | Angular Gauge |
| 143 | Thru-Hole | | 306 | Bracket |
| 144 | Axial Tension Spring | | 307 | Tab |
| 145 | Web | | 400 | Alternate Embodiment |
| 147 | Tip | | 402 | Rivet |
| 148 | Longitudinal Member | | 500 | Alternate Embodiment |
| 149 | Slot | | 501 | Hub Member |
| 150 | Alternate Pointer | | 503 | Head |
| 151 | Rivet | | 504 | Cam Lever |
| 152 | Extensible Tip | | 505 | Thru-Hole |
| 153 | Cutout | | 506 | Pin |
| 154 | Bracket | | 507 | Hole |
| 155a | Arm | | 600 | Alternate Embodiment |
| 155b | Arm | | 601 | Hub Member |
| 157 | Cutout | | 602 | Threaded Shaft |
| 158 | Longitudinal Member | | 603 | Head |
| 159 | Slot | | 605 | Groove |
| 162a | Upper Tip Member | | 606 | Annular Disk |
| 162b | Cutout | | 607 | Tab |
| 163a | Lower Tip Member | | 700 | Alternate Embodiment |
| 163b | Cutout | | 702 | Pointer |
| 164 | Threaded Member | | 703 | Slot |
| 165a | Tab | | 704 | Pointer |
| 165b | Tab | | 705 | Slot |
| 166 | Axial Compression Spring | | 706 | Pointer |
| 167a | Indent | | 707 | Slot |
| 167b | Indent | | 708 | Pointer |
| 168 | Internally Threaded Wheel | | 709 | Slot |
| 169 | Rivet | | 710 | Screw Member |
| 170 | Alternate Pointer | | 711 | Head |
| 171 | Tip | | 713 | Threaded Hole |
| 172 | Rod | | 720 | Screw Member |
| 174 | Screw | | 721 | Head |
| 175 | Threaded Hole | | 723 | Threaded Thru-Hole |
| 177 | Thru-Hole | | 730 | Screw Member |
| 178 | Longitudinal Member | | 731 | Head |
| 179 | Slot | | 733 | Threaded Thru-Hole |
| 180 | Alternate Pointer | | 740 | Screw Member |
| 181 | Tip | | 741 | Head |
| 182 | Longitudinal Member | | 743 | Threaded Thru-Hole |
| 183 | Slot | | 750 | Hub Member |
| 184 | Screw | | 751 | Head |
| 185 | Threaded Hole | | 752 | Externally Threaded Shaft |
| 188 | Longitudinal Member | | 761 | Washer |
| 189 | Slot | | 762 | Washer |
| 190 | Alternate Pointer | | 763 | Washer |
| 191a | Thru-Hole | | 764 | Washer |
| 191b | Threaded Hole | | 771 | Tip |
| 192 | Member | | 773 | Tip |
| 193 | Ball | | 775 | Tip |
| 194a | Screw | | 777 | Tip |
| 194b | Screw | | 800 | Alternate Embodiment |
| 195a | Hole | | 802 | Pointer |
| 195b | Threaded Hole | | 803 | Counterbored Slot |
| 195c | Cutout | | 805 | Washer |
| 196 | Member | | 806 | Member |
| 197a | Hole | | 807 | Thru-Hole |
| 197b | Thru-Hole | | 810 | Inner Screw Member |
| 197c | Tab | | 811 | Head |
| 198 | Longitudinal Member | | 813 | Threaded Hole |
| 199 | Slot | | 820 | Outer Screw Member |

-continued

REFERENCE NUMERALS

| | |
|---|---|
| 821 | Head |
| 823 | Threaded Thru-Hole |
| 830 | Hub Member |
| 831 | Head |
| 832 | Externally Threaded Shaft |
| 840 | Member |
| 841 | Thru-Hole |
| 842 | Extrusion |
| 871 | Tip |
| 900 | Alternate Embodiment |
| 901 | Tripod |
| 950 | Alternate Embodiment |

DETAILED DESCRIPTION

Preferred Embodiment—FIG. 1-A Through FIG. 1-G

FIG. 1-A and FIG. 1-C show a preferred embodiment 100 of the geometric tool in accordance with the present invention. Preferred embodiment 100 comprises four pointers 108, two washers 105a, a hub member 101a, and a nut 104a.

Pointers 108 are preferably manufactured from steel sheet metal and are approximately 6 inches in length, 0.5 inches in width, and 0.05 inches in thickness. However, the pointers can be manufactured to have different dimensions on a much smaller or larger scale and can be made from other materials such as brass, aluminum, plastic, wood, etc. The width proximate one end of each pointer 108 is manufactured to reduce to a vortex or tip 107. Preferably, the edges that converge to the tip are linear, however, in other embodiments they can be nonlinear as shown in FIG. 1-G. Also shown in FIG. 1-G, tip 107 and all other corners of each pointer 108 can be rounded, thereby reducing its sharpness and preventing accidental harm to the user or the specimen of interest. A slot 109 is manufactured through the thickness of each pointer 108, preferably along the centerline thereof. The length and width of each slot 109 are preferably approximately 75 percent and 50 percent of the length and width of each pointer 108, respectively. However, in other embodiments the dimensions of the slots can vary significantly.

As shown in FIG. 1-C, hub member 101a comprises a threaded shaft 102a with a head 103. Hub member is preferably manufactured from metal such as steel or aluminum, however, in other embodiments it can be manufactured as a plastic. Threaded shaft 102a has an outer diameter slightly less than the width of slots 109, preferably with threads only partially along its length. However, in other embodiments threaded shaft 102a can be fully threaded. Head 103 is manufactured on the bottom end of the threaded shaft and preferably has a star-shape perimeter with rounded corners, however, in other embodiments the head can have different geometries thereby allowing a more ergonomic grip by a human hand.

Pointers 108 are interconnected by means of hub member 101a. A first washer 105a is disposed about the hub member. Secondly, pointers 108 are disposed about the hub member such that slots 109 are concentrically located about the hub member. Thirdly, a second washer 105a is disposed about the hub member. Lastly, nut 104a having a similar pitch and thread diameter as threaded shaft 102a is twisted thereon. Nut 104a is preferably a wing nut such that the user can easily grip and comfortably transmit a rotational force, however, other embodiments can have different nut geometries to provide the user a more ergonomic grip, such as nut 104b shown in FIG. 1-E. The twisting of nut 104a about threaded shaft 102a prevents pointers 108 and washers 105a from sliding off the hub member. If nut 104a is twisted with enough force, a significant clamping force between the nut and head 103 will lock all pivoting and radial translation motion of pointers 108 with respect to hub member 101a.

Note that in other embodiments the presence, quantity, and type of washers about hub member 101a can be altered, as well as the addition of a helical spring, a spring washer, or a holed spring plate 105b such as the one shown in FIG. 1-D. Also, hub member 101b featuring a hollow threaded shaft 102b can used instead of hub member 101a, as shown in FIG. 1-F, thereby allowing the user to concentrically align the hub member with a predefined reference origin point on or near the geometric profile of interest. In addition, FIG. 1-F illustrates the presence of an optional extrusion 106 at the base of the threaded shaft. The extrusion has at least two parallel faces and extends to a height slightly less than the thickness of bottom-most pointer 108. In the absence of bottom-most washer 105a, this extrusion is adapted to fit within slot 109 of the bottom-most pointer 108, thereby preventing relative pivoting between the hub member and the bottom-most pointer. Also, in other embodiments the width of slot 109 of each pointer 108 can be adapted so that the pointers can be disposed about the shaft portion of nut 104b shown in FIG. 1-E instead of being disposed directly about hub member 101a or 101b.

As shown in FIG. 1-B, other embodiments can have varying quantities of pointers 108, ranging from as little as three up to an arbitrary amount.

Operation

Preferred Embodiment—FIG. 1-C, FIG. 2

FIG. 1-C and FIG. 2 illustrate the manner of using preferred embodiment 100 of the geometric tool. As shown, the preferred embodiment is used to capture and replicate characteristics of the geometric profile of a specimen. In this example, the user is only interested in capturing and replicating walls 050, 051 without any definition of fillet 052.

First, the user grasps preferred embodiment 100 with one hand, preferably at head 103, then untwists nut 104a about threaded shaft 102a of hub member 101a such that any clamping pressure is relieved from pointers 108. As a result, the pointers are free to pivot and radially translate with respect to hub member 101a. Secondly, the user probes tip 107 of each pointer 108 to arbitrary points on walls 050, 051 of the specimen, thereby gaining enough geometric definition. Thirdly, the user locks the pivoting and radial translational tendencies of pointers 108 by twisting nut 104a about threaded shaft 102a until the nut jams against top washer 105a, thereby creating a rigid template of points ready for replication or representation in other applications.

Note that the user can control the amount of definition to capture and replicate from the geometric profiles of specimens. To increase definition, the user simply repeats the aforementioned operation by probing additional points on the specimen of interest and replicating them according to common reference points. Note that other embodiments can have an increased quantity of pointers, thereby enabling the user to easily probe more points at once. Alternatively, definition can be purposely reduced by neglecting to probe particular features. For example, the user may only need enough definition to capture and replicate the angle between two planar surfaces such as on the specimen shown in FIG. 2, without regard to other features such as a fillet or chamfer. Since only two lines are needed to define an angle, and only two points are needed to define each line, preferred embodiment 100 provides an effective means for capturing and replicating angles.

Description

Alternate Ebodiments—FIG. 3 Through FIG. 21

The geometric tool of the present invention can comprise alternate pointers instead of aforementioned pointers 108, as illustrated in FIG. 3 through 13-D.

FIG. 3 shows an alternate pointer 110. Similar to pointer 108, it comprises a longitudinal member 112 with a slot 113, however, unlike pointer 108, alternate pointer 110 possesses a tip 111 instead of tip 107, which is manufactured to have a greater thickness in its vicinity. The geometric tool can possess multiple alternate pointers 110, each manufactured with a different thickness in the vicinity of tip 111. This feature allows the bottom face of the tip of each alternate pointer to all lie in the same plan when the pointers are stacked upon each other, which can be advantageous if the geometric tool is resting on a flat surface and the bottom face of the tip of each alternate pointer is desired to be in contact with the surface as well.

FIG. 4 shows another alternate pointer 114. Similar to pointer 108, it comprises a longitudinal member 116 with a slot 117 and a tip 115. However, unlike pointer 108, alternate pointer 114 possesses a separate member 118 affixed to the underside of longitudinal member 116. Member 118 is adapted to have the same planform shape as longitudinal member 116 in the vicinity of tip 115 and is preferably manufactured from the same material as the longitudinal member, but can be a dissimilar material in other embodiments. Member 118 is fastened to the underside of longitudinal member 116 using rivets 119, preferably of the double-countersink type. Member 118 acts to provide alternate pointer 114 with the same advantage as alternate pointer 110. Note that in other embodiments member 118 can be affixed to longitudinal member 116 by means of a structural adhesive or a screw means rather than using rivets.

FIG. 5-A shows another alternate pointer 120. Similar to pointer 108, it comprises a longitudinal member 128 with a slot 129, however, unlike pointer 108, alternate pointer 120 possesses a detachable tip or pin 127 instead of tip 107. As shown in exploded view FIG. 5-B, longitudinal member 128 has a groove 121 located on its underside surface proximate one end which is sized to accept the insertion of pin 127. The pin is affixed to longitudinal member 128 by sliding it through a hole 125 of a threaded member 124, and clamping the threaded member to longitudinal member 128 by inserting it through thru-hole 123 and twisting a nut 122 firmly thereon. The presence of pin 127 in alternate pointer 120 acts to provide a more definitive means to probe points.

FIG. 6 shows another alternate pointer 130. Similar to pointer 108, it comprises a longitudinal member 132 with a slot 133 and a tip 131. However, unlike pointer 108, alternate pointer 130 possesses a length gauge 134. The length gauge of predetermined units has equally spaced markers with reference numbers inscribed along the top surface of longitudinal member 132 either by an engraving or printing means. The length gauge is positioned such that it represents the distance from tip 131 to the center of the hub member when the pointers 130 are fully assembled with the remainder of the geometric tool. This feature is advantageous if the user desires to know the radial distance to each point that is probed.

FIG. 7 shows another alternate pointer 135. Similar to pointer 108, it comprises a longitudinal member 138 with a slot 139 and a tip 136. However, unlike pointer 108, alternate pointer 135 possesses a second tip 137 manufactured in a similar fashion as tip 136, but located on the opposite end of longitudinal member 138. This feature allows the user to probe two arbitrary points with the same pointer, thereby increasing the functionality of the geometric tool. Note that in other embodiments tip 136 and tip 137 can have different geometries. For example, tip 136 can have linear edges whereas tip 137 can have curved edges similar to tip 107 shown in FIG. 1-G.

FIG. 8 shows another alternate pointer 140. Similar to pointer 108, it comprises a longitudinal member 148 with a slot 149 and a tip 147. However, unlike pointer 108, alternate pointer 140 possesses an axial tension spring 144. Alternate pointer 140 has a region of reduced thickness or web 145 with a thru-hole 143 in the aft region of slot 149 such that the aft loop of axial tension spring 144 is hooked into the thru-hole, and the fore loop of the axial tension spring can be hooked around the hub member of the geometric tool. This feature is advantageous since it returns each pointer 140 to its extended-most position when no external forces are applied. Note that a groove for each pointer 140 can be manufactured into the circumference of the shaft of the hub member such that the fore loop of axial tension spring 144 can fit within. Also, in other embodiments the aft loop of axial tension spring 144 can be fastened to thru-hole 143 by a screw means. In addition, web 145 can be eliminated and thru-hole 143 can instead be located directly on longitudinal member 148 proximate the aft end, so long as washers of adequate thickness are installed between each alternate pointer 140 of the geometric tool, thereby still preventing contact interreference of axial tension spring 144 with an adjacent pointer.

FIG. 9-A shows another alternate pointer 150. Similar to pointer 108, it comprises a longitudinal member 158 with a slot 159, however, unlike pointer 108, alternate pointer 150 possesses an extensible tip 152 instead of tip 107, which is constrained by means of a bracket 154 and is adapted to be able to radially extend and retract with respect to longitudinal member 158 according to user input.

As shown in exploded view FIG. 9-C, extensible tip 152 comprises a flat upper tip member 162a having a cutout 162b and a flat lower tip member 163a having a cutout 163b. The upper member and lower member both have a shape such that the front end of each converges to a point. Upper tip member 162a and lower tip member 163a are preferably both made of steel sheet metal and have a length of approximately 2 in., but material and dimensions can vary in other embodiments. Indent 167a is positioned on the front edge a cutout 163b and indent 167b is positioned on its aft end. The length, width, and depth of indents 167a, 167b are sized to allow the insertion of tabs 165a, 165b respectively, which are manufactured on opposite ends of a threaded member 164. The tabs and indents both possess flat faces, thereby inhibiting free rotation of threaded member 164 with respect to lower tip member 163a. Note that in other embodiments the indents can reside in both upper tip member 162a and lower tip member 163a, or just upper tip member 162a. An axial compression spring 166 has approximately the same length as threaded member 164 and is disposed thereabout. An internally threaded wheel 168 having a similar pitch and thread diameter as threaded member 164 is also twisted thereon. Upper tip member 162*a* is fastened to lower tip member 163*a* using rivets 169, preferably of the double-countersink type, such that threaded member 164 is constrained between the upper and lower members. However, in other embodiments the members can be affixed to each other using a structural adhesive or a screw means. As internally threaded wheel 168 is twisted along the length of threaded member 164, axial compression spring 166 compresses. As a result, axial compression spring 166 produces a counterforce on the face of internally threaded wheel 168. This force gives rise to a frictional force between the threads of internally threaded wheel 168 and the threads of threaded member 164, thereby preventing free rotation of the internally threaded wheel. As a result, the position of internally threaded wheel 168 along threaded member 164 can only be altered by the twisting of the internally threaded wheel by the user.

As shown in exploded view FIG. 9-B, extensible tip 152 is located to the underside of longitudinal member 158 such that internally threaded wheel 168 protrudes through a cutout 157 in the longitudinal member, resulting in a small clearance fit. The extensible tip 152 is slidably secured to longitudinal member 158 by means of bracket 154. Bracket 154 is C-shaped, having arms 155*a*, 155*b* which wrap around longitudinal member 158 and extensible tip 152. Bracket 154 is preferably manufactured from sheet metal so that the arms can be bent to form during assembly. The bracket also has a cutout 153 of similar size to cutout 157, thereby exposing internally threaded wheel 168 on the top side of the pointer. Bracket 154 is preferably fastened to longitudinal member 158 using rivets 151, preferably of the double-countersink type. However, in other embodiments the bracket can be affixed to the longitudinal member using a structural adhesive or a screw means. Note that in other embodiments bracket 154 can be manufactured from a molded plastic or machined metal, and can also be made to resemble a closed loop instead of the un-closed C-shape shown. In addition, both the longitudinal member and the bracket can be manufactured as a single piece.

The radial translation of extensible tip 152 along longitudinal member 158 is controlled by the twisting of internally threaded wheel 168. This allows the user to have fine control of extensible tip 152 when probing points.

FIG. 10-A shows another alternate pointer 170. Similar to pointer 108, it comprises a longitudinal member 178 with a slot 179, however, unlike pointer 108, alternate pointer 170 possesses a longitudinal member or rod 172. Rod 172 is preferably manufactured from steel and is approximately 6 inches in length, however, in other embodiments the material and length can vary significantly. As shown in exploded view FIG. 10-B, the rod converges to a tip 171 on its bottom end. Longitudinal member 178 has a thru-hole 177 proximate its front end, whereby rod 172 can be slidably located within with a slight clearance fit. Longitudinal member 178 also has a threaded hole 175 with its axis perpendicular and intersecting with the axis of thru-hole 177 such that the user can twist a screw 174 into the threaded hole, thereby locking the depth of rod 172 with respect to longitudinal member 178. This feature allows the user to probe points on three-dimensional specimens that have significant vertical variations. Note that in other embodiments the axis of thru-hole 177 can be at an arbitrary angle with respect to the top surface of longitudinal member 178 and does not necessarily have to be perpendicular, thereby enabling 172 to extend to greater radial distances. In addition, multiple thru-holes 177 can exist simultaneously, each with an axis at an arbitrary angle. This allows the user to place rod 172 in the most favorable hole according to his or her application.

FIG. 11-A shows another alternate pointer 180 which possesses similar advantages as alternate pointer 170. Alternate pointer 180 comprises a longitudinal member 188 with a slot 189, however, unlike alternate pointer 170, alternate pointer 180 possesses a longitudinal member 182 instead of rod 172. Longitudinal member 182 is preferably manufactured from steel sheet metal and is approximately 6 inches in length, however, in other embodiments the material and length can vary significantly. As shown in exploded view FIG. 11-B, longitudinal member 182 converges to a tip 181 on its bottom end and also has a slot 183 along its length. Longitudinal member 188 has a threaded hole 185 on its side, proximate the front end, thereby allowing longitudinal member 182 to be screwed thereon with a screw 184. As a result, the user can pivot and slide longitudinal member 182 with respect to longitudinal member 188, and then sequentially lock in place simply by twisting screw 184 until it jams against the longitudinal member. Note that in other embodiments the pointer can have a washer located on one or both sides of longitudinal member 182. Alternatively, longitudinal member 182 can be replaced with pointer 210 later described and shown in FIG. 13-A.

FIG. 12-A shows another alternate pointer 190. Similar to alternate pointer 170, it comprises a longitudinal member 198 with a slot 199 and rod 172 with tip 171. However, unlike alternate pointer 170 wherein the rod can only slide in one direction, alternate pointer 190 possesses a ball-and-socket joint such that the rod can be angled to an arbitrary direction and subsequently slid accordingly, thereby increasing the geometric tool's range and flexibility. As shown in exploded view FIG. 12-B, the ball-and-socket joint comprises a member 192 which is preferably manufactured from steel, however, can also be manufactured from different metals or plastics. Member 192 has a thru-hole 191*a* on its top surface, whereby rod 172 can be slidably located within with a slight clearance fit. Member 192 also has a threaded hole 191*b* with its axis perpendicular and intersecting with the axis of thru-hole 191*a* such that the user can twist a screw 194*a* into the threaded hole, thereby locking the sliding motion of rod 172 with respect to member 192. A ball 193 is manufactured into the aft end of member 192. Longitudinal member 198 has a hole 195*a* proximate its front end, preferably of the countersunk type, with a diameter slightly less than the diameter of ball 193 so that the hole acts as the bottom of the socket which accepts the ball. The top of the socket is provided by a member 196 with a hole 197*a*. Hole 197*a* is also preferably countersunk on the bottom surface of the member. The member is preferably manufactured from sheet metal so that that a tab 197*c* can easily be formed on its aft end, which is adapted to fit inside a cutout 195*c* in longitudinal member 198, thereby preventing the sliding motion of member 196 with respect to the longitudinal member. Member 196 has a thru-hole 197*b* and longitudinal member 198 has a threaded hole 195*b* so that member 196 can be secured to longitudinal member 198 by means of screw 194*b*, thereby acting as a means to lock rotation of ball 193 of member 192. As a result, the user can pivot and slide rod 172 accordingly to probe points with tip 171, and then sequentially clamp in place simply by twisting screws 194*a*, 194*b*. Note that in other embodiments holes 197*a*, 195*a* can be blind holes instead of thru-holes, preferably with rounded bottoms.

FIG. 13-A shows an alternate pointer 210. Unlike pointer 108 which is a longitudinal member comprising slot 109, alternate pointer 210 comprises a longitudinal member or rod 218a with a tip 217a, which can pivot and radially translate with respect to the hub member by means of an intermediary member 212a. Rod 218a and member 212a are preferably manufactured from steel, however, can be made of different metals or plastics in other embodiments. As shown in exploded view FIG. 13-B, member 212a has a thru-hole 213b having a diameter slightly greater than the diameter of rod 218a such that the rod can be slideably located within with a slight clearance fit. Member 212a also has a threaded hole 213c with its axis perpendicular and intersecting with the axis of thru-hole 213b such that the user can twist a screw 214a into the threaded hole until it jams against rod 218a, thereby locking its sliding motion. The top face of member 212a has a thru-hole 213a with a diameter slightly larger than the diameter of the shaft of the hub member of the geometric tool such that a multitude of alternate pointers 210 can be disposed thereabout. As a result, the user can capture and replicate points by pivoting and sliding each rod 218a accordingly to probe points with tip 217a. Note that the sliding motion of the rod of each individual pointer can be separately locked by twisting each screw 214a. In other embodiments the pivoting motion of each pointer can also be individually locked by incorporating a member 212b instead of member 212a, as shown in FIG. 13-D. Member 212b is similar to member 212a, however, it further comprises a threaded hole 219 adapted to accept a screw 214b. The pivoting motion of each pointer therefore can be individually locked by twisting screw 214b, thereby clamping the pointer to the shaft of the hub member. Note that rod 218a can be substituted with a rod 218b as shown in FIG. 13-C, which includes a bend 215 proximate the front end and formed at an arbitrary angle such that tip 217b extends in the downward direction. Each alternate pointer 210 can have a rod 218b of distinct length and distinct bend 215 location such that when the pointers are assembled to the geometric tool, all the tips 217b lie in the same plane. Rod 218b preferably has a flat face 216 on its side so that screw 214a prevents the rod from undesired rotation within thru-hole 213b of member 212a, even when the threaded member is only partially screwed therein. Also, note that in other embodiments the aft ends of rods 218a, 218b and members 212a, 212b can be adapted with additional holes and interconnected with axial tension springs, thereby returning rods 218a, 218b to the extended-most positions when no external forces are applied.

Alternate embodiments of the geometric tool are illustrated in FIG. 14-A through FIG. 21.

FIG. 14-A shows an alternate embodiment 300. Alternate embodiment 300 is similar to preferred embodiment 100, however, it further comprises an angular gauge 302. The angular gauge is an annular disk with equally spaced markers and reference numbers inscribed along its outer perimeter either by an engraving or printing means, which preferably represent degrees from zero to three-hundred and sixty. Angular gauge 302 is preferably manufactured from steel, however, can be made of different metals or plastics in other embodiments. As shown in exploded view FIG. 14-B, a bracket 306, which is constrained to the remaining alternate embodiment 300, is adapted to constrain angular gauge 302 such that the angular gauge can still rotate within. Bracket 306 resembles an annular disk with at least three, preferably four, tabs 307 that are adapted to reach upwards and hold angular gauge 302 down and centered. The bracket is preferably made from sheet metal wherein the tabs are crimped to form during assembly, however, in other embodiments the bracket can be manufactured as a molded plastic. The presence of angular guage 302 allows the user to arbitrarily define an angular reference system by rotating the angular gauge to a desired position, thereby enabling the user to capture the relative angles at which each pointer 108 lies. Note that the markers on angular gauge 302 do not have to be inscribed radial to the center of the angular gauge, rather, can be inscribed at an arbitrary angular offset.

FIG. 15 shows an alternate embodiment 400. Alternate embodiment 400 is similar to preferred embodiment 100, however, unlike preferred embodiment 100 which comprises hub member 101a and nut 104a to constrain motion of pointers 108, alternate embodiment 400 comprises a rivet 402. The rivet is installed such to permanently clamp pointers 108 together with enough pressure so that adequate frictional forces arise between the pointers, thereby preventing free pivoting and radial translation of the pointers, yet still being adjustable by the force of the user. This feature simplifies the manufacturability and operation of the invention.

FIG. 16-A shows an alternate embodiment 500. Alternate embodiment 500 is similar to preferred embodiment 100, however, unlike preferred embodiment 100 which comprises hub member 101a and nut 104a to constrain motion of pointers 108, alternate embodiment 500 comprises a hub member 501 and a cam lever 504, as shown in exploded view FIG. 16-B. Hub member 501 is a shaft with a head 503 manufactured on the bottom end and a thru-hole 505 proximate the top end. Cam lever 504 is shaped to surround hub member 501 so that the cam portion is in contact with the top washer. The cam lever is preferably manufactured from steel, however, can be made of different metals or plastics in other embodiments. Cam lever 504 also has a hole 507 such that it can be rotatably affixed to the top end of hub member 501 by means of a pin 506. The diameters of holes 505, 507 are selected such that at least one results in an interference fit with pin 506, thereby preventing the pin from freely sliding out of the holes, yet still allowing the user to rotate cam lever 504 with respect to hub member 501. The geometry of the cam lever 504 is adapted so that the user can clamp pointers 108 in place by depressing the cam lever, and release the pointers by lifting the cam lever.

Exploded view FIG. 17 shows an alternate embodiment 600. Alternate embodiment 600 is similar to preferred embodiment 100, however, unlike preferred embodiment 100 which comprises hub member 101a, alternate embodiment 600 comprises a hub member 601 and a multitude of annular disks 606. Hub member 601 comprises a threaded shaft 602, preferably only partially threaded, with a head 603 manufactured on the bottom end. An arbitrary amount of grooves 605, preferably four, are manufactured along the length of threaded shaft 602. Tabs 607 are manufactured on the inner perimeter of each annular disk 606. The quantity of tabs on each annular disk must equal the number of grooves 605 on threaded shaft 602. The size of each tab is adapted to provide either a close clearance or small interference fit, thereby restricting rotation of the annular disks with respect to hub member 601 once installed thereabout. Preferably, the quantity and arrangement of annular disks 606 are such that each pointer is adjacent to an annular disk on both its top side and bottom side. Note that in other embodiments the annular disk adjacent to head 603 and/or the annular disk adjacent to nut 104a can be omitted. Since annular disks 606 are interlocked with hub member 601 by means of tabs and grooves, the user can easily pivot and slide an arbitrary pointer without causing unwanted movement to an adjacent pointer that would otherwise occur due to friction forces.

FIG. 18-A shows an alternate embodiment 700. Alternate embodiment 700 comprises a first pointer 702, a second pointer 704, a third pointer 706, a fourth pointer 708, and a means for constraining motion of the pointers to only pivot and radially translate with respect to a shared axis of rotation, configured so that the relative motion of each pointer can also be individually locked by the user.

Top view FIG. 18-B shows alternate embodiment 700 wherein all of the pointers are aligned. Section view FIG. 18-C illustrates the constraining means used which comprises the concentric arrangement of a hub member 750, a first screw member 710, a second screw member 720, a third screw member 730, and a fourth screw member 740. As shown in exploded view FIG. 18-D, hub member 750 comprises an externally threaded shaft 752 with a head 751 manufactured on the bottom end. The first screw member 710 is a threaded shaft with a head 711 manufactured on the top end and a threaded hole 713 manufactured interiorly. Threaded hole 713 is preferably a thru-hole, however, can be a blind hole in other embodiments. The diameter and pitch of threaded hole 713 is such that the first screw member 710 can be screwed about externally threaded shaft 752 of hub member 750. Likewise, the second screw member 720 is a threaded shaft with a head 721 and a threaded thru-hole 723. The diameter and pitch of threaded thru-hole 723 is such that the second screw member 720 can be screwed about the first screw member 710. Likewise, the third screw member 730 is a threaded shaft with a head 731 and a threaded thru-hole 733. The diameter and pitch of threaded thru-hole 733 is such that the third screw member 730 can be screwed about the second screw member 720. The fourth screw member 740 is a shaft with a head 741 and a threaded thru-hole 743. The diameter and pitch of threaded thru-hole 743 is such that the fourth screw member 740 can be screwed about the third screw member 730.

The first pointer 702 is a longitudinal member comprising a tip 771 and a slot 703. Likewise, the second pointer 704 is a longitudinal member comprising a tip 773 and a slot 705. The third pointer 706 is a longitudinal member comprising a tip 775 and a slot 707. The fourth pointer 708 is a longitudinal member comprising a tip 777 and a slot 709. The slots are sized such that the width of slot 703 is slightly greater than the diameter of externally threaded shaft 752, the width of slot 705 is slightly greater than the diameter of the first screw member 710, the width of slot 707 is slightly greater than the diameter of the second screw member 720, and the width of slot 709 is slightly greater than the diameter of the third screw member 730.

Pointers 702, 704, 706, 708 are stacked upon each other and are concentrically located about hub member 750. The pointers are constrained by means of the telescopic installation of screw members 710, 720, 730, 740 about hub member 750. This feature allows the user to lock the motion of each pointer individually. For example, the user can first lock the first pointer 702 by twisting the first screw member 710, then lock the second pointer 704 by twisting the second screw member 720, then lock the third pointer 706 by twisting the third screw member 730, then lock the fourth pointer 708 by twisting the fourth screw member 740. Preferably, washers 761, 762, 763, 764 each having different inner diameters are located adjacent to the pointers as shown. However, the presence and quantity of the washers can vary in other embodiments. Note that other embodiments can have varying quantities of pointers and screw members, ranging from as little as three up to an arbitrary amount.

FIG. 19-A shows an alternate embodiment 800. Alternate embodiment 800 is similar to preferred embodiment 100, however, alternate embodiment 800 comprises pointers 802 instead of pointers 108, as well as a different constraining means. Each pointer 802 is a longitudinal member comprising a tip 871 and a counterbored slot 803, wherein the counterbore is preferably on both sides of the pointer.

Top view FIG. 19-B shows alternate embodiment 800 wherein all of the pointers are aligned. Section view FIG. 19-C illustrates the constraining means which comprises the concentric arrangement of a hub member 830, members 806, an inner screw member 810, and an outer screw member 820. As shown in exploded view FIG. 19-D, hub member 830 comprises an externally threaded shaft 832 with a head 831 manufactured on the bottom end. Inner screw member 810 is a threaded shaft with a head 811 manufactured on the top end and a threaded hole 813 manufactured interiorly. Threaded hole 813 is preferably a thru-hole, however, can be a blind hole in other embodiments. The diameter and pitch of threaded hole 813 is such that inner screw member 810 can be screwed about externally threaded shaft 832. Outer screw member 820 is a shaft with a head 821 and a threaded thru-hole 823. The diameter and pitch of threaded thru-hole 823 is such that outer screw member 820 can be screwed about inner screw member 810.

Members 806 have a width slightly less than the width of the counterbored slot 803 of each pointer 802 and a thickness approximately equal to the thickness of each pointer. The members are preferably manufactured from steel, however, can be made of different metals or plastics in other embodiments. Each member 806 has a thru-hole 807 of slightly larger diameter than the diameter of externally threaded shaft 832.

Pointers 802 are stacked upon each other and are concentrically located about externally hub member 830. Members 806 are also concentrically located about hub member 830 such that each pointer 802 has a member 806 centered within its slot. The pointers are constrained by means of the telescopic installation of screw members 810, 820 about hub member 830. This feature allows the user to first clamp all members 806 together by twisting inner screw member 810, thereby also locking the pivoting motion all pointers 802. The user can then lock the sliding motion of all the pointers by twisting outer screw member 820. Preferably, a washer 805 is located between head 831 of hub member 830 and the bottom-most pointer 802, however, the presence and quantity of washers can vary in other embodiments. Note that the counterbore in the counterbored slots 803 prevent each pointer 802 from snagging on an adjacent member 806. In other embodiments, countersunk slots can be used instead of counterbored slots. Alternatively, a standard slot can be used and each member 806 can be replaced with a member 840, as shown in FIG. 19-E, which comprises an extension 842 of reduced material, preferably of circular geometry, on the top and/or bottom surface, with a thru-hole 841.

FIG. 20 shows an alternate embodiment 900. Alternate embodiment 900 is similar to preferred embodiment 100, however, pointers 108 are concentrically located about the threaded shaft of a tripod 901 instead of hub member 101a. This allows the user to steadily adjust and retain the plane in which the pointers lie while probing points.

FIG. 21 shows an alternate embodiment 950. Alternate embodiment 950 demonstrates the ability to combine two embodiments 100, thereby increasing the range and quantity of pointers 108 available to the user. This is achieved by aligning the slots of one pointer from each embodiment 100 and connecting them by means of an additional hub member 101a and nut 104a as shown. Preferably, washers 105a are also installed, however, the presence and quantity of washers can be altered in other embodiments. Additionally, a second hub member 101a and nut 104a can be used to strengthen the connection of the two embodiments 100. Alternatively, in other embodiments a series of tapped or untapped holes can be manufactured in each pointer such that the pointers can be connected to each other using a small screw means.

CONCLUSION, RAMIFICATIONS, AND SCOPE

Accordingly, the reader will see that the geometric tool of the present invention provides a simple, compact, economical, and effective device for capturing and replicating the relative positions of points on a geometric profile. Furthermore, the geometric tool has the additional advantages in that this device can be quickly used to capture the relative positions of multiple points of a geometric profile and subsequently be used as a template for replication purposes such as tracing, aligning, or measuring;

this device does not require the user to read gauges, which increases ease of operation while eliminating the roundoff error inherent with reading gauges;

this device can be used in confined and hard to access areas; and this device does not require a power source or computer to operate.

While the above description contains many specificities, these should not be construed as limitations on the scope of the invention, but as exemplifications of the presently preferred embodiments thereof. Many other ramifications and variations are possible within the teachings of the invention. The scale of the invention can be made much larger or smaller than previously discussed so as to be used in a variety of applications; there can be a helical spring, spring washer, or a holed plate spring added to the stack-up about the hub member; either the hub member can be replaced by a threaded rivet stud rigidly affixed to the bottom-most pointer or the nut can be replaced by a rivet nut rigidly affixed to the top-most pointer, etc.

Thus, the scope of the invention should be determined by the appended claims and their legal equivalents, and not by the examples given above.

I claim:

1. A geometric tool for capturing and replicating the relative positions of points on a geometric profile, comprising:
   (a.) three or more pointers, wherein each of said pointers is a longitudinal member comprising a definitive tip and a slot, wherein said slot is located along the length of said longitudinal member, wherein each said longitudinal member of said pointers is also uniquely bent in the vicinity of said tip such that said tips of said pointers all extend down to a common plane when said pointers are stacked upon each other;
   (b.) a means for constraining motion of said pointers to only pivot and radially translate with respect to a shared axis of rotation, configured so that said means for constraining motion of said pointers can also be manipulated by a user such that said pointers become fully constrained with respect to said shared axis of rotation;
   wherein said geometric tool can be used to probe the relative positions of arbitrary points on a geometric profile with said tips of said pointers, and subsequently lock said pointers in place, thereby creating a template for use in geometric representation and replication.

2. The geometric tool according to claim 1, wherein each of said pointers further comprises an axial tension spring, wherein one end loop of said axial tension spring is affixed to said longitudinal member in the vicinity of the aft end of said slot, and the opposite end loop of said axial tension spring is affixed to said means for constraining motion of said pointers.

3. The geometric tool according to claim 1, wherein said means for constraining motion of said pointers comprises a hub member and a nut, wherein said hub member comprises a threaded shaft with grooves along the length thereof and a head manufactured on one end of said threaded shaft, and a plurality of annular disks with one or more tabs manufactured along the inner perimeter of each said annular disk, wherein said annular disks and said pointers are alternately stacked and concentrically located about said threaded shaft of said hub member, wherein said tabs of said annular disks engage with said grooves of said threaded shaft, thereby preventing friction forces from being transmitted between said pointers due to relative pivoting and radial translation motion of said pointers, whereby the twisting of said nut about said threaded shaft locks the pivoting and radial translation motion of all said pointers with respect to said hub member.

4. A geometric tool for capturing and replicating the relative positions of points on a geometric profile, comprising:
   (a.) three or more pointers, wherein each of said pointers is a longitudinal member comprising a slot, said slot being located along the length of said longitudinal member, a tip manufactured on one end of said longitudinal member, and a member of predetermined thickness affixed to the underside of said longitudinal member in the vicinity of said tip, wherein said member has approximately the same planform shape as said longitudinal member in the vicinity of said tip;
   (b.) a means for constraining motion of said pointers to only pivot and radially translate with respect to a shared axis of rotation, configured so that said means for constraining motion of said pointers can also be manipulated by a user such that said pointers become fully constrained with respect to said shared axis of rotation;
   wherein said geometric tool can be used to probe the relative positions of arbitrary points on a geometric profile with said tips of said pointers, and subsequently lock said pointers in place, thereby creating a template for use in geometric representation and replication.

5. A geometric tool for capturing and replicating the relative positions of points on a geometric profile, comprising:
   (a.) three or more pointers, wherein each of said pointers comprises a longitudinal member with a slot, said slot being located along the length of said longitudinal member, an extensible tip, said extensible tip comprising at least one tip member with a cutout and a threaded member, said threaded member affixed to said tip member and visible within said cutout, a helical spring and an internally threaded wheel, said helical spring and said internally threaded wheel concentrically located about said threaded member, wherein a bracket slidably affixes said extensible tip to one end of said longitudinal member, wherein a cutout in said longitudinal member exposes said internally threaded wheel, whereby the twisting of said internally threaded wheel causes extension or retraction of said extensible tip with respect to said longitudinal member;
   (b.) a means for constraining motion of said pointers to only pivot and radially translate with respect to a shared axis of rotation, configured so that said means for constraining motion of said pointers can also be manipulated by a user such that said pointers become fully constrained with respect to said shared axis of rotation;

wherein said geometric tool can be used to probe the relative positions of arbitrary points on a geometric profile with said tips of said pointers, and subsequently lock said pointers in place, thereby creating a template for use in geometric representation and replication.

6. A geometric tool for capturing and replicating the relative positions of points on a geometric profile, comprising:
(a.) three or more pointers, wherein each of said pointers comprises a rod, wherein a tip is manufactured on one end of said rod, a longitudinal member with a slot, said slot being located along the length of said longitudinal member, wherein said rod is pivotally and slidably affixed to one end of said longitudinal member by means of a ball-and-socket joint, whereby the twisting of a screw locking means locks the pivoting and sliding motion of said rod with respect to said longitudinal member;
(b.) a means for constraining motion of said longitudinal members of said pointers to only pivot and radially translate with respect to a shared axis of rotation, configured so that said means for constraining motion can also be manipulated by a user such that said longitudinal members of said pointers become fully constrained with respect to said shared axis of rotation;
wherein said geometric tool can be used to probe the relative positions of arbitrary points on a geometric profile with said tips of said pointers, and subsequently lock said pointers in place, thereby creating a template for use in geometric representation and replication.

7. A geometric tool for capturing and replicating the relative positions of points on a geometric profile, comprising:
(a.) three or more pointers, wherein each of said pointers comprises a rod, wherein a tip is manufactured on one end of said rod, a member with at least a first thru-hole and a relatively perpendicular oriented second thru-hole, wherein said first thru-hole has a diameter slightly greater than said rod, wherein said rod is slidably located within said first thru-hole, whereby the twisting of a screw locking means locks the sliding motion of said rod within said first thru-hole;
(b.) a means for constraining motion of said members of said pointers to only pivot with respect to a shared axis of rotation comprising a hub member, wherein the diameter of said hub member is slightly less than the diameter of said second thru-hole of each said member of said pointers such that said members can be stacked and concentrically located about said hub member such to only pivot with respect to said shared axis of rotation, wherein said means for constraining motion can also be manipulated by a user such that pivoting of said members of said pointers becomes locked with respect to said shared axis of rotation;
wherein said geometric tool can be used to probe the relative positions of arbitrary points on a geometric profile with said tips of said pointers, and subsequently lock said pointers in place, thereby creating a template for use in geometric representation and replication.

8. The geometric tool according to claim 7, wherein said member of each said pointer further comprises a second screw locking means whereby the pivoting motion of each said member of each said pointer can be individually locked with respect to said shared axis of rotation.

9. The geometric tool according to claim 7, wherein each said rod of said pointers is uniquely bent in the vicinity of said tip such that said tips of said pointers all extend down to a common plane when said pointers are stacked upon each other.

10. The geometric tool according to claim 7, wherein each said rod of said pointers further comprises one or more flat faces along the length thereof, thereby allowing the user to partially engage said screw locking means of said member so that said rod can slide within said first thru-hole, but twisting of said rod within said first thru-hole is restricted.

11. A geometric tool for capturing and replicating the relative positions of points on a geometric profile, comprising:
(a.) three or more pointers, wherein each of said pointers is a longitudinal member comprising a slot and a tip manufactured on one end, said slot being located along the length of said longitudinal member and having a unique slot width from said slots of the remaining said pointers;
(b.) a hub member and a plurality of screw members equal to the quantity of said pointers, wherein said hub member comprises a threaded shaft with a head manufactured on one end, wherein each of said screw members is a shaft comprising a head on one end and a threaded hole within said shaft, wherein each of said screw members may also have external threads of a distinct diameter and length such that said screw members can be telescopically arranged, wherein said pointers and said screw members are concentrically located about said hub member, whereby the twisting of the innermost said screw member locks the bottommost said pointer in place, the twisting of the second said screw member additionally locks the second said pointer in place, the twisting of the third said screw member additionally locks the third said pointer in place, etc.;
wherein said geometric tool can be used to probe the relative positions of arbitrary points on a geometric profile with said tips of said pointers, and subsequently lock said pointers in place, thereby creating a template for use in geometric representation and replication.

12. The geometric tool according to claim 11, wherein each of said pointers further comprises a member of predetermined thickness affixed to the underside of said longitudinal member in the vicinity of said tip, wherein said member has approximately the same planform shape as said longitudinal member in the vicinity of said tip.

13. The geometric tool according to claim 11, wherein each of said pointers further comprises an axial tension spring, wherein one end loop of said axial tension spring is affixed to said longitudinal member in the vicinity of the aft end of said slot, and the opposite end loop of said axial tension spring is affixed about the axis of corresponding said screw member.

14. The geometric tool according to claim 11, wherein each of said pointers further comprises a rod, wherein a tip is manufactured on one end of said rod, a thru-hole, said thru-hole being located in the vicinity of one end of said longitudinal member of said pointer, wherein said rod is slidably located within said thru-hole, whereby the twisting of a screw locking means locks the depth of said rod within said thru-hole.

15. The geometric tool according to claim 11, wherein each of said pointers further comprises a second longitudinal member with a slot, said slot being located along the length of said second longitudinal member, wherein a tip is manufactured on one end of said second longitudinal member, wherein said second longitudinal member is pivotally and slidably affixed to one end of said longitudinal member of claim 11 by a screw locking means such that the plane of said slot of said second longitudinal member remains perpendicular to the plane of said slot of said longitudinal member of claim 11, whereby the twisting of said screw locking means locks the pivoting and sliding motion of said second longitudinal member with respect to said longitudinal member of claim 11.

16. A geometric tool for capturing and replicating the relative positions of points on a geometric profile, comprising:

(a.) three or more pointers, wherein each of said pointers is a longitudinal member comprising a counterbored slot, said counterbored slot being located along the length of said longitudinal member, and a tip manufactured on one end of said longitudinal member;

(b.) a hub member, a plurality of holed members equal to the quantity of said pointers, an inner screw member, and an outer screw member, wherein said hub member comprises a threaded shaft with a head manufactured on one end, wherein each of said holed members has at least two parallel sides and a thru-hole of slightly greater diameter than said threaded shaft of said hub member, wherein said inner screw member is a threaded shaft comprising a head on one end and a threaded hole within, wherein said outer screw member is a shaft comprising a head on one end and a threaded hole within, wherein said screw members each have a distinct diameter and length such that said screw members can be telescopically arranged, wherein said pointers and said holed members and said screw members are concentrically located about said hub member so that one said holed member is centered within said slot of each said pointer, whereby the twisting of said inner screw member clamps all of said holed members in place, thereby locking the pivoting motion of all of said pointers with respect to said hub member, and subsequently the twisting of said outer screw member clamps all of said pointers in place, thereby further locking the radial translation motion of all of said pointers with respect to said hub member;

wherein said geometric tool can be used to probe the relative positions of arbitrary points on a geometric profile with said tips of said pointers, and subsequently lock said pointers in place, thereby creating a template for use in geometric representation and replication.

17. The geometric tool according to claim 16, wherein each of said pointers further comprises a member of predetermined thickness affixed to the underside of said longitudinal member in the vicinity of said tip, wherein said member has approximately the same planform shape as said longitudinal member in the vicinity of said tip.

18. The geometric tool according to claim 16, wherein each of said pointers further comprises a rod, wherein a tip is manufactured on one end of said rod, a thru-hole, said thru-hole being located in the vicinity of one end of said longitudinal member of said pointer, wherein said rod is slidably located within said thru-hole, whereby the twisting of a screw locking means locks the depth of said rod within said thru-hole.

19. The geometric tool according to claim 16, wherein each of said pointers further comprises a second longitudinal member with a slot, said slot being located along the length of said second longitudinal member, wherein a tip is manufactured on one end of said second longitudinal member, wherein said second longitudinal member is pivotally and slidably affixed to one end of said longitudinal member of claim 16 by a screw locking means such that the plane of said slot of said second longitudinal member remains perpendicular to the plane of said slot of said longitudinal member of claim 16, whereby the twisting of said screw locking means locks the pivoting and sliding motion of said second longitudinal member with respect to said longitudinal member of claim 16.

\* \* \* \* \*